US009171428B2

(12) United States Patent
Berman et al.

(10) Patent No.: US 9,171,428 B2
(45) **Date of Patent: *Oct. 27, 2015**

(54) GAMING METHOD AND APPARATUS FOR FACILITATING A GAME INVOLVING SPECIALTY FUNCTIONALITY

(71) Applicant: KING SHOW GAMES, INC., Minnetonka, MN (US)

(72) Inventors: Bradley Berman, Minnetonka, MN (US); Chad Shapiro, Plymouth, MN (US); Jacob Lamb, Maple Grove, MN (US); Adam Martin, St. Louis Park, MN (US); Jason Malkovich, Brooklyn Park, MN (US); Bradley Cripe, St. Paul, MN (US); Anand Hurkadli, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,425

(22) Filed: Jan. 20, 2014

(65) Prior Publication Data

US 2014/0148242 A1 May 29, 2014

Related U.S. Application Data

(63) Continuation of application No. 12/784,317, filed on May 20, 2010, now Pat. No. 8,641,503.

(60) Provisional application No. 61/180,023, filed on May 20, 2009.

(51) Int. Cl.

| | |
|---|---|
| ***G06F 17/00*** | (2006.01) |
| ***G07F 17/34*** | (2006.01) |
| ***G07F 17/32*** | (2006.01) |

(52) U.S. Cl.
CPC ............ *G07F 17/34* (2013.01); *G07F 17/3265* (2013.01)

(58) Field of Classification Search
CPC ............................... G07F 17/32; G07F 17/326
USPC ..................................................... 463/16–20
See application file for complete search history.

(56) References Cited

U.S. PATENT DOCUMENTS

| | | | | |
|---|---|---|---|---|
| 6,315,663 | B1 | 11/2001 | Sakamoto | |
| 6,997,804 | B2 * | 2/2006 | Berman | 463/20 |
| 7,040,985 | B2 | 5/2006 | Vancura | |
| 7,070,502 | B1 | 7/2006 | Bussick et al. | |
| 7,331,862 | B2 * | 2/2008 | Rodgers et al. | 463/16 |

(Continued)

OTHER PUBLICATIONS

IGT, "Slot Line Special Show Edition", 2007, 5 pages.

(Continued)

*Primary Examiner* — Michael Cuff

(57) ABSTRACT

Various embodiments concern a method for facilitating a gaming activity having specialty functionality comprising providing a grid formed by a plurality of elements and marking elements of the plurality with markings selected from a plurality of marking-types, the plurality of marking-types including a feature marking-type. A plurality of feature indicators can be positioned in the grid. Then, for each element of the plurality that is marked with the feature marking-type and positionally associated with a feature indicator of the plurality, the feature marking-type can be re-marked to a respective element of the plurality that is adjacent to the element marked with the feature marking-type and positionally associated with the feature indicator. An outcome can then be determined based on one or more combinations of the markings.

15 Claims, 21 Drawing Sheets

(56) References Cited

U.S. PATENT DOCUMENTS

| | | | | |
|---|---|---|---|---|
| 7,338,369 | B2 * | 3/2008 | Mierau et al. | 463/20 |
| 7,445,547 | B2 | 11/2008 | Suzuki | |
| 7,553,231 | B2 * | 6/2009 | Rodgers et al. | 463/20 |
| 7,568,973 | B2 * | 8/2009 | Iddings et al. | 463/25 |
| 7,654,898 | B2 | 2/2010 | Vancura | |
| 7,674,176 | B2 | 3/2010 | Berman et al. | |
| 2004/0038780 | A1 | 2/2004 | Kuo | |
| 2004/0048646 | A1 * | 3/2004 | Visocnik | 463/16 |
| 2005/0054429 | A1 | 3/2005 | Baerlocher et al. | |
| 2005/0130731 | A1 | 6/2005 | Englman et al. | |
| 2005/0130737 | A1 | 6/2005 | Englman et al. | |
| 2007/0232382 | A1 | 10/2007 | Berman | |
| 2008/0032775 | A1 * | 2/2008 | Yoshizawa | 463/20 |
| 2008/0051174 | A1 | 2/2008 | Fiden | |
| 2008/0108411 | A1 | 5/2008 | Jensen et al. | |
| 2008/0113735 | A1 | 5/2008 | Maya | |
| 2008/0176652 | A1 * | 7/2008 | Yoshizawa | 463/31 |
| 2008/0188286 | A1 * | 8/2008 | Jaffe | 463/20 |
| 2008/0287178 | A1 | 11/2008 | Berman et al. | |
| 2008/0300037 | A1 | 12/2008 | Wilson | |
| 2009/0048013 | A1 * | 2/2009 | Castellari | 463/20 |
| 2009/0069071 | A1 * | 3/2009 | Aoki et al. | 463/20 |
| 2009/0075722 | A1 * | 3/2009 | Louie et al. | 463/20 |
| 2009/0111563 | A1 * | 4/2009 | Layton | 463/20 |
| 2009/0143131 | A1 * | 6/2009 | Yoshizawa | 463/20 |
| 2009/0186684 | A1 * | 7/2009 | Visser | 463/20 |
| 2009/0203418 | A1 * | 8/2009 | Yoshizawa | 463/20 |
| 2010/0004049 | A1 * | 1/2010 | Ching et al. | 463/20 |
| 2010/0016054 | A1 * | 1/2010 | Berman et al. | 463/18 |
| 2010/0120495 | A1 * | 5/2010 | Frank et al. | 463/20 |
| 2010/0120507 | A1 * | 5/2010 | Rodgers et al. | 463/20 |
| 2010/0178976 | A1 | 7/2010 | Berman et al. | |
| 2010/0210343 | A1 * | 8/2010 | Englman et al. | 463/20 |
| 2010/0298041 | A1 | 11/2010 | Berman et al. | |

OTHER PUBLICATIONS

IGT, Da Vinci Diamonds Video Slot Brochure, 2007, 2 pages.

IGT, Marilyn Monroe Diamond Cinema brochure, 2001, 2 pages.

IGT, Super Hyper Pays, 2009, 4 pages.

IGT, Super Hyper Pays, Silver Hawk Slots, 2009, 2 pages.

* cited by examiner

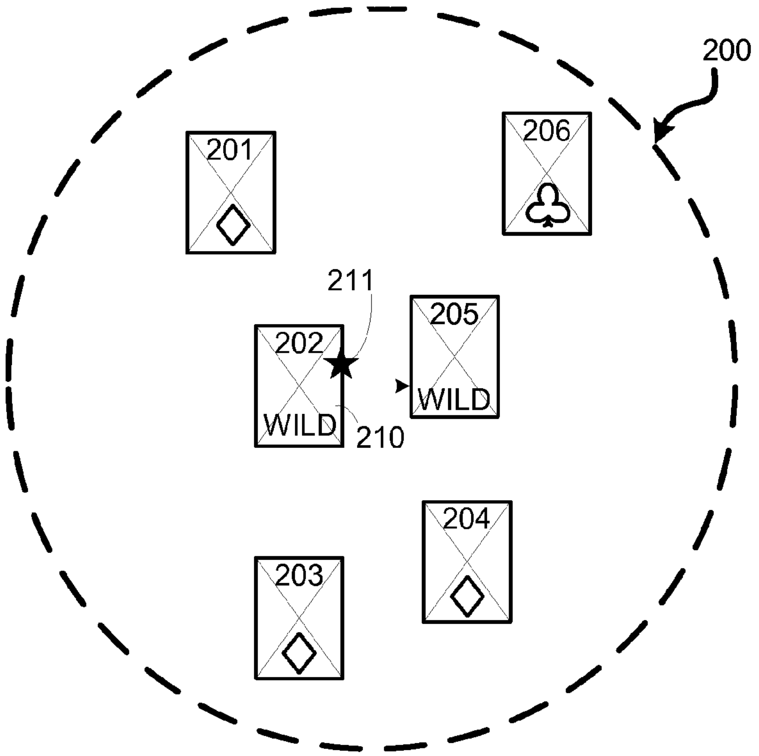
Fig. 2D
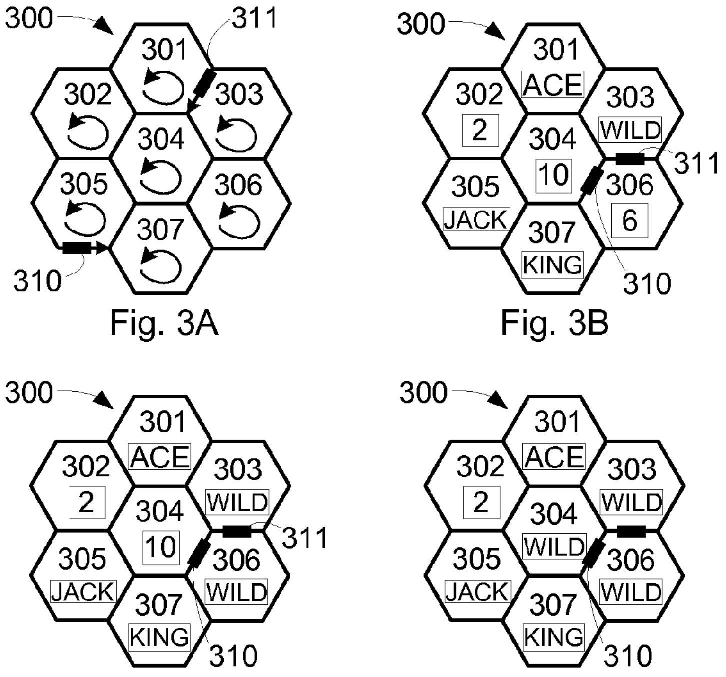
Fig. 3C
Fig. 3D

GAMING METHOD AND APPARATUS FOR FACILITATING A GAME INVOLVING SPECIALTY FUNCTIONALITY

RELATED APPLICATIONS

This application is a continuation of U.S. application Ser. No. 12/784,317, filed May 20, 2010, which claims the benefit of Provisional Patent Application No. 61/180,023, filed on May 20, 2009, pursuant to 35 U.S.C. §119(e), both of which are incorporated herein by reference in their entirety.

FIELD OF THE INVENTION

This invention relates in general to gaming systems and processes, and more particularly to gaming systems, methods and apparatuses for facilitating a game involving specialty functionality.

BACKGROUND

Gaming devices such as slot machines have entertained the public for over a century. While the fundamental concept behind slot games has remained relatively intact, the manners of computing, displaying, and participating in modern day slot games have changed dramatically. One force driving these changes is technological advancement, such as the advent of computers and video capabilities. Another driving force is human nature, as the participants of such gaming devices demand continual excitement and stimulation. It is therefore important in the gaming industry that gaming innovations continue to be rolled out to the participating public.

Conventional slot games and the like involve relatively linear game play that can become repetitive and monotonous for a player. For example, a conventional slot machine involves repeatedly spinning three reels in an attempt to line reel symbols up in a configuration that triggers a payout. While the outcome of each game is not predictable, the manner of game play is identical each time the game is played. Such games can have limited ability in sustaining a player's interest as the game play becomes monotonous over time.

SUMMARY

To overcome limitations in the prior art described above, and to overcome other limitations that will become apparent upon reading and understanding the present specification, the present invention discloses systems, apparatuses and methods for providing, among other features, games with specialty functionality.

Various method embodiments concern providing a grid formed by a plurality of elements, marking elements of the plurality with markings selected from a plurality of marking-types, the plurality of marking-types including a feature marking-type, positioning a plurality of feature indicators in the grid, for each element of the plurality that is marked with the feature marking-type and positionally associated with a feature indicator of the plurality, re-marking the feature marking-type to a respective element of the plurality that is adjacent to the element marked with the feature marking-type and positionally associated with the feature indicator, and determining an outcome based on one or more combinations of the markings.

Methods can include that re-marking the feature marking-type to the element that is adjacent to the element marked with the feature marking-type and positionally associated with the feature indicator further comprises: determining a directional relationship between the feature indicator and the element that is marked with the feature marking-type and positionally associated with the feature indicator, and determining which element of the plurality will be re-marked with the feature marking-type based on the directional relationship, the element to be re-marked having the same directional relationship with the element marked with the feature marking-type and positionally associated with the feature indicator as the feature indicator has with the element that is marked with the feature marking-type and positionally associated with the feature indicator.

Methods can include that the feature marking-type is a wild marking that imparts wild functionality to the element to which it is marked.

Methods can include that the steps of positioning the plurality of feature indicators and re-marking the feature marking-type are repeated until all elements of the plurality that are re-marked with the feature marking-type and are positionally associated with the feature indicator have already caused another element of the plurality to be re-marked.

Methods can include that determining the outcome based on one or more combinations of the markings further comprises: identifying a first set of one or more combinations of the markings after marking elements of the plurality with markings but before re-marking the feature marking-type, identifying a second set of one or more combinations of the markings after re-marking the feature marking-type, and issuing a payout based on the first set and the second set.

Methods can include that providing a chance based opportunity to add one or more feature indicators to the grid for each re-marking of the feature marking-type to the grid, and for each element of the plurality that is re-marked with the feature marking-type and positionally associated with an added feature indicator of the plurality, re-marking the feature marking-type to a respective element of the plurality that is adjacent to the element that was re-marked with the feature marking-type and positionally associated with the added feature indicator, wherein the steps of providing the chance based opportunity to add one or more feature indicators to the grid and re-marking the feature marking-type are repeated until the step of providing the chance based opportunity to add one or more feature indicators to the grid fails to add any feature indicators positionally associated with any elements re-marked with the feature marking-type.

Methods can include that positioning the plurality of feature indicators in the grid further comprises moving the plurality of feature indicators along parallel paths of the grid and then stopping the plurality of feature indicators at respective grid locations.

Methods can include that the feature indicators are graphically depicted to be hinges, positioning the plurality of feature indicators in the grid comprises aligning the feature indicators along edges of the elements, the feature indicator is positionally associated with the element based on the feature indicator being proximate and aligned with a side of the element, and re-marking the feature marking-type to the element of the plurality further comprises graphically depicting the feature marking-type of the element marked with the feature marking-type and positionally associated with the feature indicator to pivot about the feature indicator and stop at the element being re-marked.

Methods can include that the feature indicator and the element marked with the feature marking-type are positionally associated based on the feature indicator being aligned with, and proximate, a side of the element.

Methods can include that the feature indicator and the element marked with the feature marking-type are positionally associated based on there being overlap between the feature indicator and the element.

Various embodiments concern a computer-readable medium having instructions stored thereon which are executable by the processor for facilitating a game having element re-marking functionality performing steps comprising: displaying a play area on a display device, the play area comprising a plurality of elements; marking elements of the plurality with markings selected from a plurality of marking-types, the plurality of marking-types including a feature marking-type; positioning a plurality of feature indicators in the grid; for each element of the plurality that is marked with the feature marking-type and positionally associated with a feature indicator of the plurality, re-marking the feature marking-type to an element of the plurality that is adjacent to the element marked with the feature marking-type and positionally associated with the feature indicator; and determining an outcome based on one or more combinations of the markings.

Computer-readable medium might have further instructions stored thereon which are executable by the processor for facilitating the game such that re-marking the feature marking-type to the element that is adjacent to the element marked with the feature marking-type and positionally associated with the feature indicator further comprises: determining a directional relationship between the feature indicator and the element that is marked with the feature marking-type and positionally associated with the feature indicator; and determining which element of the plurality will be re-marked with the feature marking-type based on the directional relationship, the element to be re-marked having the same directional relationship with the element marked with the feature marking-type and positionally associated with the feature indicator as the feature indicator has with the element that is marked with the feature marking-type and positionally associated with the feature indicator.

Computer-readable medium might have further instructions stored thereon which are executable by the processor for facilitating the game such that the feature marking-type is a wild marking that imparts wild functionality to the element to which it is marked.

Computer-readable medium might have further instructions stored thereon which are executable by the processor for facilitating the game such that the steps of positioning the plurality of feature indicators and re-marking the feature marking-type are repeated until all elements of the plurality that are re-marked with the feature marking-type and are positionally associated with the feature indicator have already caused another element of the plurality to be re-marked.

Computer-readable medium might have further instructions stored thereon which are executable by the processor for facilitating the game such that determining the outcome based on one or more combinations of the markings further comprises: identifying a first set of one or more combinations of the markings after marking elements of the plurality with markings but before re-marking the feature marking-type; identifying a second set of one or more combinations of the markings after re-marking the feature marking-type; and issuing a payout based on the first set and the second set.

Computer-readable medium might have further instructions stored thereon which are executable by the processor for facilitating the game by performing steps comprising: providing a chance based opportunity to add one or more feature indicators to the grid for each re-marking of the feature marking-type to the grid; and for each element of the plurality that is re-marked with the feature marking-type and positionally associated with an added feature indicator of the plurality, re-marking the feature marking-type to a respective element of the plurality that is adjacent to the element that was re-marked with the feature marking-type and positionally associated with the added feature indicator, wherein the steps of providing the chance based opportunity to add one or more feature indicators to the grid and re-marking the feature marking-type are repeated until the step of providing the chance based opportunity to add one or more feature indicators to the grid fails to add any feature indicators positionally associated with any elements re-marked with the feature marking-type.

Computer-readable medium might have further instructions stored thereon which are executable by the processor for facilitating the game such that positioning the plurality of feature indicators in the grid further comprises moving the plurality of feature indicators along parallel paths of the grid and then stopping the plurality of feature indicators at respective grid locations.

Computer-readable medium might have further instructions stored thereon which are executable by the processor for facilitating the game such that: the feature indicators are graphically depicted to be hinges; positioning the plurality of feature indicators in the grid comprises aligning the feature indicators along edges of the elements; the feature indicator is positionally associated with the element based on the feature indicator being proximate and aligned with a side of the element; and re-marking the feature marking-type to the element of the plurality further comprises graphically depicting the feature marking-type of the element marked with the feature marking-type and positionally associated with the feature indicator to pivot about the feature indicator and stop at the element being re-marked.

Computer-readable medium might have further instructions stored thereon which are executable by the processor for facilitating the game such that the feature indicator and the element marked with the feature marking-type are positionally associated based on the feature indicator being aligned with, and proximate, a side of the element.

Computer-readable medium might have further instructions stored thereon which are executable by the processor for facilitating the game such that the feature indicator and the element marked with the feature marking-type are positionally associated based on there being overlap between the feature indicator and the element.

Various embodiments concern gaming apparatuses for facilitating a game having specialty functionality including a display device and circuitry configured to: facilitate display of a play area on the display device, the play area comprising a plurality of elements; control marking elements of the plurality with markings selected from a plurality of marking-types, the plurality of marking-types including a feature marking-type; control positioning of a plurality of feature indicators in the grid; for each element of the plurality that is marked with the feature marking-type and positionally associated with a feature indicator of the plurality, control re-marking of the feature marking-type to a respective element of the plurality that is adjacent to the element marked with the feature marking-type and positionally associated with the feature indicator; and determine an outcome based on one or more combinations of the markings.

Circuitry of gaming apparatuses may be configured such that re-marking the feature marking-type to the element that is adjacent to the element marked with the feature marking-type and positionally associated with the feature indicator further comprises: determining a directional relationship between the feature indicator and the element that is marked with the feature marking-type and positionally associated with the feature indicator; and determining which element of the plurality will be re-marked with the feature marking-type based on the directional relationship, the element to be re-marked having the same directional relationship with the element marked with the feature marking-type and positionally associated with the feature indicator as the feature indicator has with the element that is marked with the feature marking-type and positionally associated with the feature indicator.

Circuitry of gaming apparatuses may be configured such that the feature marking-type is a wild marking that imparts wild functionality to the element to which it is marked Circuitry of gaming apparatuses may be configured such that the steps of positioning the plurality of feature indicators and re-marking the feature marking-type are repeated until all elements of the plurality that are re-marked with the feature marking-type and are positionally associated with the feature indicator have already caused another element of the plurality to be re-marked.

Circuitry of gaming apparatuses may be configured such that determining the outcome based on one or more combinations of the markings further comprises: identifying a first set of one or more combinations of the markings after marking elements of the plurality with markings but before re-marking the feature marking-type; identifying a second set of one or more combinations of the markings after re-marking the feature marking-type; and issuing a payout based on the first set and the second set.

Circuitry of gaming apparatuses may be configured to: provide a chance based opportunity to add one or more feature indicators to the grid for each re-marking of the feature marking-type to the grid; and for each element of the plurality that is re-marked with the feature marking-type and positionally associated with an added feature indicator of the plurality, re-mark the feature marking-type to a respective element of the plurality that is adjacent to the element that was re-marked with the feature marking-type and positionally associated with the added feature indicator, wherein the steps of providing the chance based opportunity to add one or more feature indicators to the grid and re-marking the feature marking-type are repeated until the step of providing the chance based opportunity to add one or more feature indicators to the grid fails to add any feature indicators positionally associated with any elements re-marked with the feature marking-type.

Circuitry of gaming apparatuses may be configured such that positioning the plurality of feature indicators in the grid further comprises moving the plurality of feature indicators along parallel paths of the grid and then stopping the plurality of feature indicators at respective grid locations.

Circuitry of gaming apparatuses may be configured such that: the feature indicators are graphically depicted to be hinges; positioning the plurality of feature indicators in the grid comprises aligning the feature indicators along edges of the elements; the feature indicator is positionally associated with the element based on the feature indicator being proximate and aligned with a side of the element; and re-marking the feature marking-type to the element of the plurality further comprises graphically depicting the feature marking-type of the element marked with the feature marking-type and positionally associated with the feature indicator to pivot about the feature indicator and stop at the element being re-marked.

Circuitry of gaming apparatuses may be configured such that the feature indicator and the element marked with the feature marking-type are positionally associated based on the feature indicator being aligned with, and proximate, a side of the element.

Circuitry of gaming apparatuses may be configured such that the feature indicator and the element marked with the feature marking-type are positionally associated based on there being overlap between the feature indicator and the element.

Various embodiments concern gaming apparatuses for facilitating a game having specialty functionality comprising: means for providing a grid formed by a plurality of elements; means for marking elements of the plurality with markings selected from a plurality of marking-types, the plurality of marking-types including a feature marking-type; means for positioning a plurality of feature indicators in the grid; means for re-marking the feature marking-type to a respective element of the plurality that is adjacent to the element marked with the feature marking-type and positionally associated with the feature indicator for each element of the plurality that is marked with the feature marking-type and positionally associated with a feature indicator of the plurality; and means for determining an outcome based on one or more combinations of the markings.

In some gaming apparatuses, re-marking the feature marking-type to the element that is adjacent to the element marked with the feature marking-type and positionally associated with the feature indicator further comprises: determining a directional relationship between the feature indicator and the element that is marked with the feature marking-type and positionally associated with the feature indicator; and determining which element of the plurality will be re-marked with the feature marking-type based on the directional relationship, the element to be re-marked having the same directional relationship with the element marked with the feature marking-type and positionally associated with the feature indicator as the feature indicator has with the element that is marked with the feature marking-type and positionally associated with the feature indicator.

In some gaming apparatuses, the feature marking-type is a wild marking that imparts wild functionality to the element to which it is marked.

In some gaming apparatuses, the steps of positioning the plurality of feature indicators and re-marking the feature marking-type are repeated until all elements of the plurality that are re-marked with the feature marking-type and are positionally associated with the feature indicator have already caused another element of the plurality to be re-marked.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

FIGS. 2A-D illustrate an embodiment of a gaming activity utilizing specialized enabling functionality in accordance with aspects of the invention;

FIGS. 3A-D illustrate an embodiment of a gaming activity utilizing specialized enabling functionality in accordance with aspects of the invention;

DETAILED DESCRIPTION

In the following description of the invention, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

In conventional slot machine gaming, a player watches for alignment of a series of symbols to trigger payouts, such as horizontal alignment of three cherry symbols. The symbols are typically presented on a plurality of spinning reels (actual reels or graphically depicted reels) and the positioning of the reels after spinning determines the symbol alignment and payouts associated with symbol series formation. This conventional game play can become monotonous for a player because the player is essentially looking for one thing as the reels slow down—the alignment of symbols on the reels. The present disclosure provides dynamic and layered game play which entertains and excites players beyond conventional game play.

In contrast to the mere lining up of multiple symbols in a conventional slot game, game aspects of the present disclosure can provide game outcomes favorable to the player beyond conventional symbol alignment, while in some cases also preserving some spinning reel/symbol alignment aspects liked by players. As will be further described, embodiments of the present disclosure involve multilayered game play aspects that provide for less predictable manner of game play and therefore greater excitement for the player.

Figure 1A:
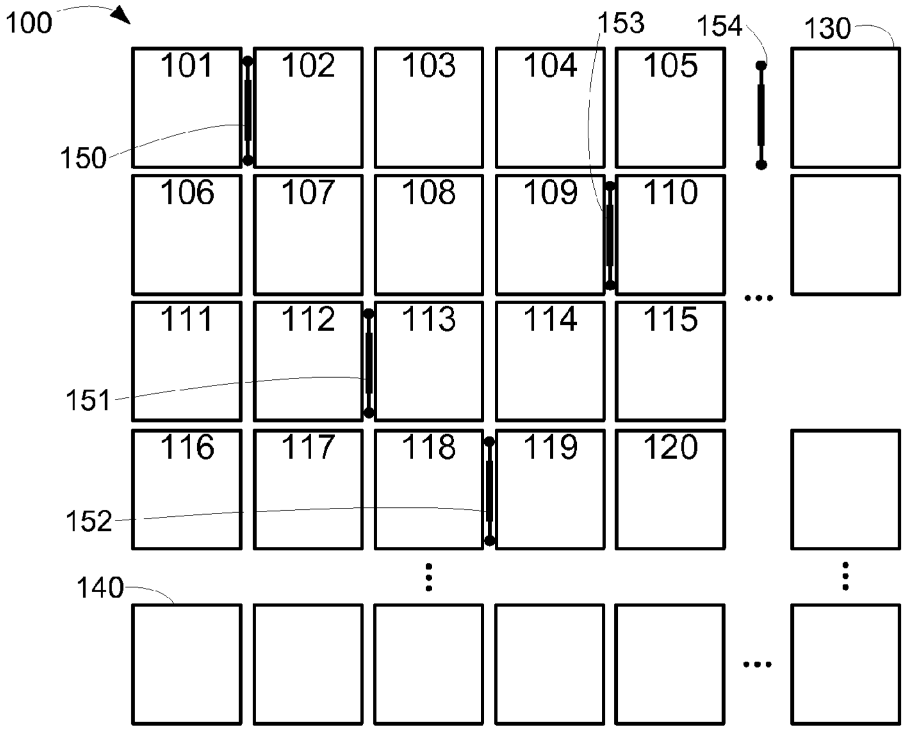
FIG. 1A-I illustrate an embodiment of a gaming activity utilizing specialized enabling functionality in accordance with aspects of the invention.

FIG. 1A illustrates a multilayered gaming embodiment. The gaming embodiment of FIG. 1A includes a play area 100 inside of which are a plurality of game elements 101-120 arranged to form a grid pattern. Additional rows 140 and columns 130 of elements are illustrated to show that play areas and grids referenced herein can be different in sizes, and therefore can have a greater and/or lesser number of rows and/or columns than the play area 100 of FIG. 1A, or the other play areas shown herein.

FIG. 1A also illustrates five feature indicators 150-153, which are illustrated to be hinges. The feature indicators 150-153 are associated with specialized functionality that will be discussed further herein. In various embodiments, one or more feature indicators move around and/or appear in a play area during the course of game play.

Movement of the one or more feature indicators may be in any random direction, as if one of the feature indicators was wandering about a play area. In some embodiments, movement of feature indictors is restricted to predetermined paths. For example, in the embodiment of FIGS. 1A-I, feature indicator 150 can move vertically between the column of elements 101-106-111-116 and the column of elements 102-107-112-117; feature indicator 151 can move vertically between the column of elements 102-107-112-117 and the column of elements 103-108-113-118; feature indicator 152 can move vertically between the column of elements 103-108-113-118 and the column of elements 104-109-114-119; and feature indicator 153 can move vertically between the column of elements 104-109-114-119 and the column of elements 105-110-115-120. In this manner, the feature indicators 150-153 move only along vertical grid lines. In the embodiment of FIGS. 1A-I, feature indicators 150-153 do not move between rows of the play area 100, however the embodiment could be modified so that such horizontal movement is performed additionally or exclusively. In various other embodiments, feature indicators are not restricted to vertical motion and include, or are restricted to, vertical, horizontal, and/or diagonal motion.

Figure 1B:
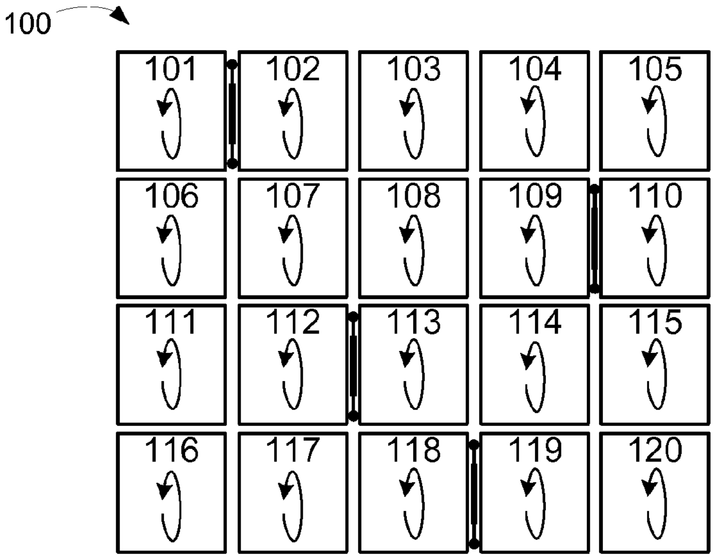

In the stage of game play in FIG. 1A, none of the elements 101-120 have been marked. FIG. 1B illustrates the elements 101-120 being marked with symbols.

In some embodiments, reels are spun to populate the play area 100 with symbols. For example, elements 101-106-111-116 could represent one vertically orientated reel, elements 102-107-112-117 could represent another vertically orientated reel, as so on such that the play area 100 is composed of 5 vertically orientated reels (or more, depending on how many additional columns 130 are used).

Play area 100 can be represented on a display screen, where animation is used to show the process of marking the elements 101-120 with symbols. FIG. 1B shows circling arrows that are used to graphically represent the process of randomly marking elements 101-120 of the play area 100 (e.g., to represent as if each element 101-120 was spinning and then stopped to display a particular symbol). Random as used herein includes any level of randomness, including weighted and unweighted outcomes, and does not require absolute randomness unless specified. Also, terms referring to "spin" herein refer to a process of selecting one or more markings. Therefore, a re-spin may refer to a process of randomly selecting a marking symbol for an element for re-marking.

Marking, as referred to herein, includes distinguishing at least one element from at least one other element. There are many ways in which one element can be distinguished from another element, and therefore there are many different ways to mark an element. For example, an element could be marked simply by it being created or located in an array or display area. Generally, elements are marked by adding a symbol to the element, which can include placing and/or representing a graphic, one or more colors, flag, characters, images, design, numbers, letters, shapes, or features of a type on, or in associated with, an element. In some embodiments, elements are not marked by any color, letter or numeral, and in those embodiments, the elements themselves can be markings. Distinguishing of elements can be done to physical elements, such as element pieces of a board or on a reel strip. Distinguishing of elements can also be done to elements represented on a display screen.

Marking can be done in various ways. For example, some elements can be randomly marked, such that there is a probability that a particular element will be marked or not marked. Determining whether a particular element will be marked can be done by various means, including random number generation, as discussed herein. If an element is selected to be marked, then another step can be taken to determine which one of the available different marking-types will be used to mark the particular element. However, in some embodiments only one marking-type is available. In some embodiments, a process is conducted to randomly select a particular marking-type for an element, and amongst the different marking outcomes that can be selected is an outcome where the element is not marked.

In some embodiments, only a certain number of elements will be marked and some of the elements will be left unmarked. An evaluation can then be conducted to determine whether, for example, a series of adjacent marked elements was formed to calculate payouts. In some embodiments, all elements of a particular type or grid will be marked and a random number generator or other selection means will be used to determine the particular marking for each element of the type or grid.

In some embodiments, a particular marking-type can be repeatedly used to mark elements. In other embodiments, a particular marking-type can only be used to mark elements a certain number of times in a particular game or round (e.g., only 5 elements can be marked with a spade symbol).

Figure 1C:
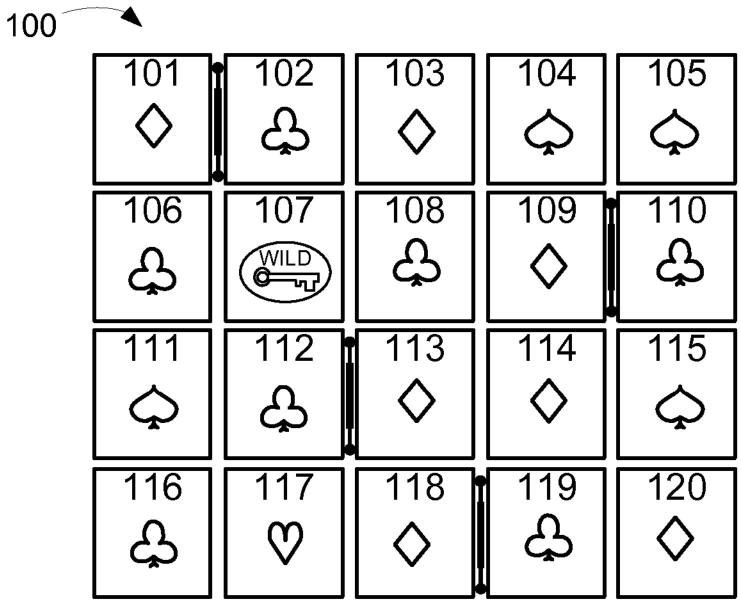
Figure 1D:
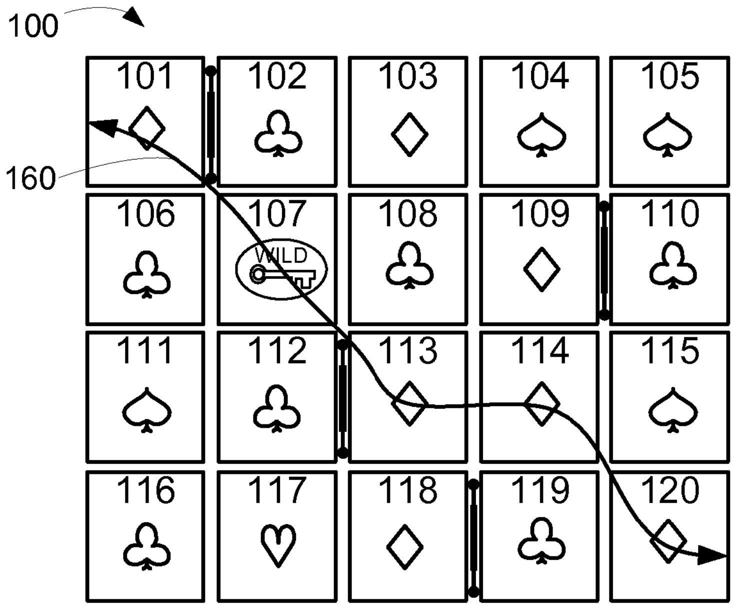

FIG. 1C shows the play area 100 after each element 101-120 has been marked with one respective symbol. For example, element 101 was marked with a diamond symbol, element 106 was marked with a club symbol, element 111 was marked with a spade symbol, element 117 was marked with a heart symbol, and element 107 was marked with a feature symbol (illustrated in this embodiment as a wild key symbol). The various markings of the elements 101-120 can be used to form combinations of corresponding symbols that trigger a payout according to a pay table. FIG. 1D shows the identification of such a combination of adjacent corresponding symbols. Line 160 is used to indicate that elements 101-107-113-114-120 form a combination of adjacent corresponding elements. Elements 101-107-113-114-120 correspond because each is marked with a common symbol-type (diamond) or is marked as wild and therefore has wild functionality.

Wild functionality allows a game element to correspond to any of the other game elements, regardless of how the other element is marked, to form winning groups of elements and trigger payouts. For example, a group of five corresponding markings present in respective elements of the play area 100 may be required to trigger a payout, such as five heart markings or five spade markings on elements. While five common markings might not be present in a play area, game elements with wild functionality may correspond to any other game element marking, such as spade and/or heart, to complete one or more winning sets of five correspondingly marked elements.

In the particular embodiment illustrated in FIGS. 1A-3D, correspondence between elements requires not only an identical symbol marking, but also that a minimum number of identically marked elements (or functional equivalents, i.e. wilds) are displayed in a round of game play (e.g., the minimum being five in FIGS. 1A-I). As such, even though two club symbols are shown in elements 106 and 108 on opposite sides of wild symbol marked element 107, they do not correspond according to the illustrated embodiment, because the threshold number of identical elements for correspondence is five. However, some other embodiments are not so limited, and in some other embodiments, any other number could be required for the elements to correspond, including two similarly marked elements.

While elements 101-107-113-114-120 correspond to one another by each having an identical marking or having wild functionality, there are various other ways in which elements can correspond to one another, according to various embodiments. For example, elements could correspond to one another not by having the same mark-type, but rather by just having a mark (e.g., as in embodiments were only some of the elements are marked). But in some embodiments, elements will only correspond if they have the same letter, number, image, color, or other similar marking-type. In some embodiments, elements will correspond if they are marked with marking-types selected from a particular group, and the elements need not all have identical markings to correspond to one another. For example, elements may correspond to one another because each is marked with an image of a dog, even though all image markings on the elements are of a different breed of dog.

In some embodiments, elements correspond to one another if their markings form a progressive series. In such embodiments, adjacent elements might only correspond if they are marked with consecutive numbering. In other embodiments, letter marked elements may only correspond if the adjacent elements spell a word. In some embodiments, marked elements may correspond if a word can be spelled from the marked elements of an array, regardless of whether the elements are adjacent to one another.

Elements 113, 114, and 120 not only are identically marked, but also help form a series of adjacently located elements. There are many different ways in which an element of the various embodiments of the invention can be adjacent to another element. For example, two elements could be considered to be adjacent to one another if they share a common corner. However, various embodiments do not consider the mere sharing of a corner to make two elements adjacent.

Two elements may share a common wall despite there being a small gap illustrated between the framing of each element. Two square elements may be adjacent in various embodiments because their respective proximate and opposing walls are aligned against and/or proximate one another. Adjacency in this sense relates to the concept of how the elements of a play area are orientated and positioned with respect to each other and not precisely how each element is illustrated.

According to various embodiments, elements in contact with and/or within close proximity to one another can be considered to be adjacent. Elements can be in contact with one another by sharing walls, lines, points, segments, portions and/or features. Elements can also be in contact by overlapping each other in some manner. Elements proximate each other can be adjacent by having walls aligned (e.g., 113 and 114) or having corners opposite one another (e.g., elements 114 and 120). Other types of adjacency may be provided as well. For example, in some embodiments, only those symbols that are adjacent in a horizontal, vertical, or diagonal fashion will be deemed "adjacent." In some alternative embodiments, only symbols that are horizontal, or that are vertical, or that are diagonal, may be deemed adjacent. Symbols may also be deemed adjacent along opposite edges of the play area, as if the edges were wrapped around to intersect with one another. Three dimensional display grids may also be used in accordance with the embodiments referenced herein, such that elements sharing a wall, corner or segment may be considered to be adjacent.

In various embodiments, a series of corresponding adjacent elements can be dynamically identified. Dynamic identification includes locating winning segments that can take any number of forms. As opposed to classic three reel strip slot matching, where a series of winning symbols could only be formed along one row, dynamic identification allows segments to be formed in many other ways, including segments that repeatedly change direction along their length. For example, a payline moving left-to-right could start in a top row on the left hand side of the play area and end in a lower row on the right side of a play area.

Typical slot based games have a simple manner of game play with a predictable conclusion to game play as discussed previously. In contrast to typical slot based games, the embodiment of FIGS. 1A-I has further aspects of game play that enable specialty functionality, provided certain game conditions are met. Embodiments of this disclosure use one or more feature indicators to control stages of game play, were the appearance of a feature indicator in association with a feature symbol (e.g., a wild symbol) initiates specialty functionality, which can involve additional rounds of game play.

Figure 1E:
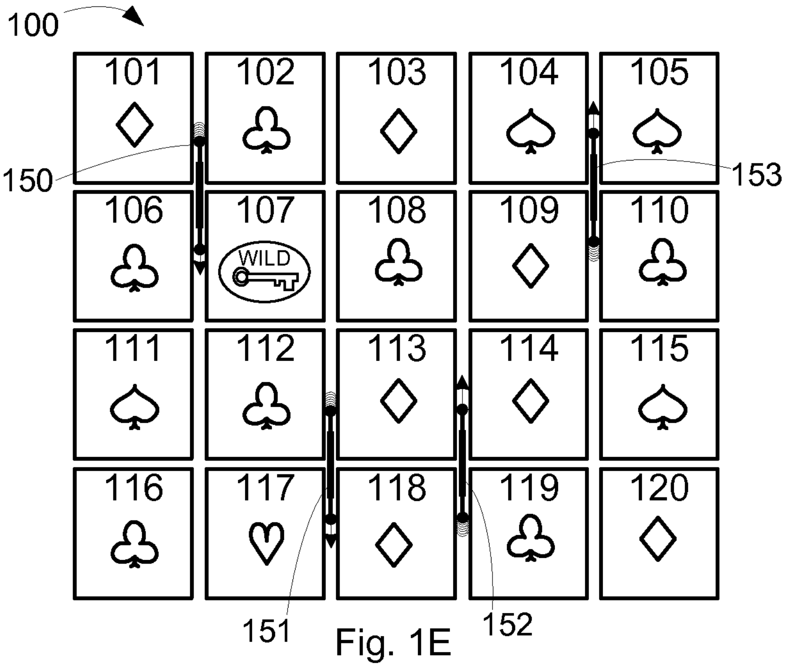
Figure 1F:
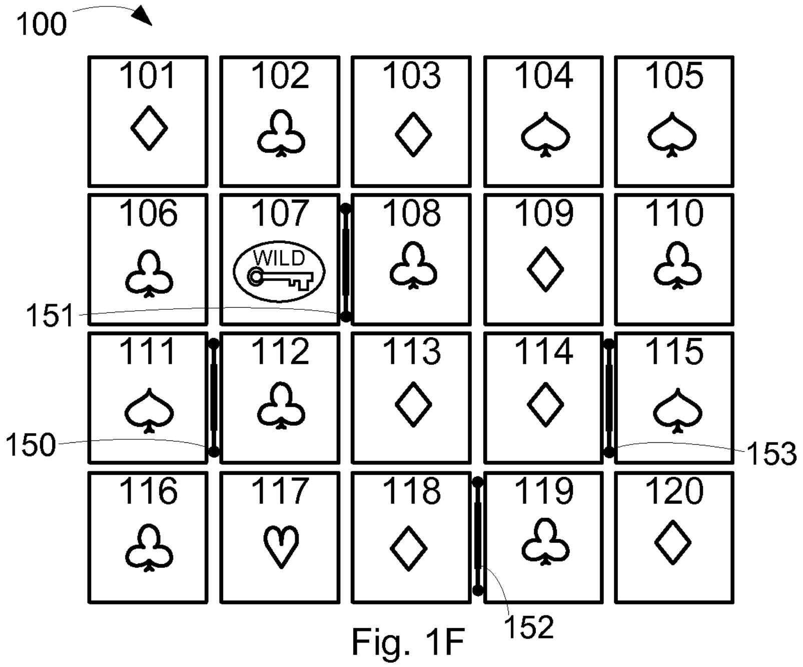
Figure 1G:
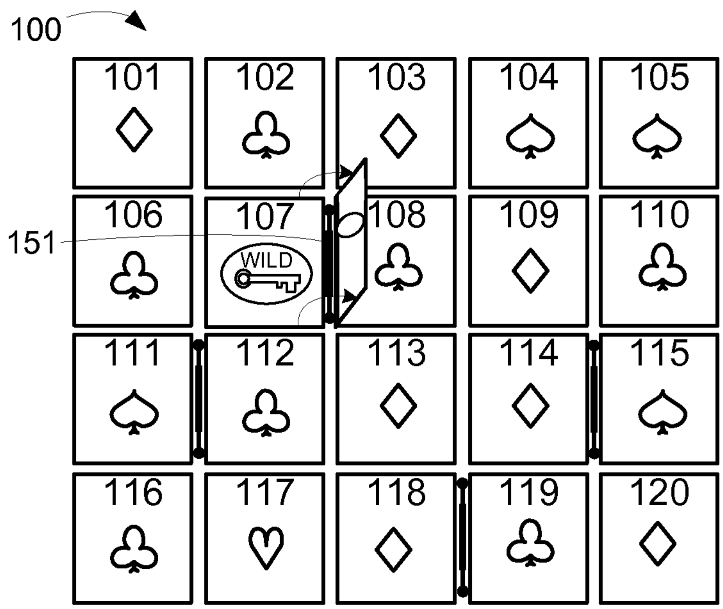

FIG. 1E shows the feature indicators 150-153 in motion. As described previously, the feature indicators 150-153 move vertically between the top and bottom of the play area 100 between the columns of the elements. The movement of the feature indicators 150-153 can be in one or more directions (e.g., up or down until the top or bottom of the grid is reached, and then reversing to go in the opposite direction) for a set number of element spaces (e.g., 1, 3, 5, or more) or a set or random duration of time, among other options. The feature indicators 150-153 eventually stop at predetermined or random positions, as shown in FIG. 1F. In some embodiments, the stopping positions can be randomly selected, and then the feature indicators are animated to move to and then stop (or appear) at the selected positions.

In FIG. 1F, it is shown that feature indicator 151 stopped at a position associated with the right side of element 107 and the left side of element 108, making the feature indicator 151 positionally associated with these portions of elements 107 and 108. Each of the elements 101-120 has a plurality of portions. For example, element 107 has a top portion, a bottom portion, a left portion, and a right portion. In some embodiments, square or rectangular elements each have these four portions. In various embodiments, corner portions are additionally or alternatively used, comprising top-left, top-right, bottom-left, and bottom-right portions, for example. A portion of an element can be a one-dimensional side (e.g., top, bottom, left, right), corner (e.g., top-right, bottom-right, bottom-left, top-left), and/or some two dimensional coverage of an element (e.g., top, bottom, left, right).

Feature indicator 151 is positionally associated with the right side of element 107 and the left side of element 108 because it is aligned with, and proximate, these portions. In some embodiments, a feature indicator must be aligned with, contacting, overlapping, intersecting, and/or spanning a portion of an element to be positionally associated with the portion. Feature indicator 151 is not positionally associated with any portions of element 102, for example, because according to the particular embodiment of FIG. 1F a feature indicator must be proximate to, and aligned with, a vertical wall (i.e. side) of an element. However, in various other embodiments having different rules, feature indicator 151 could be positionally associated with the lower-right corner of element 102, such embodiments recognizing corner positional association. Feature indicator 151 is aligned with the left side of element 107, as well as the right side of element 106. However, in various embodiments, including in FIG. 1F, a feature indicator 151 must be proximate a portion of an element to be positionally associated with the portion and the element. The right side of element 106 and the left side of element 107 are not proximate the feature indicator 151, and therefore the feature indicator is not determined to be positionally associated with either of these portions, however element 107 is positionally associated with feature indicator 151.

Positional association, as used herein, refers to a spatial relationship between an element marked with a feature marking-type and a feature indicator. As used herein, the element marked with a feature marking-type is positionally associated with the feature indicator when the spatial relationship between the element and the feature indicator satisfies predetermined criteria, which may trigger specialty functionality. In various embodiments, a feature indicator can be positionally associated with an element marked with a feature marking-type by the feature indicator being proximate and aligned with a portion of the element, the feature indicator touching the portion of the element, the feature indicator overlapping with the portion of the element, the feature indicator being proximate the portion of the element, the feature indicator intersecting the portion of the element, the feature indicator being overlapped by the portion of the element, or in some manner indicating an association between the feature indicator and the portion of the element in a predetermined way using relative positioning of the feature indicator and the portion of the element.

Specialty functionality can be triggered by satisfaction of two conditions: (1) a first element being marked with a feature marking-type; and (2) the first element also being positionally associated with a feature indicator. The specialty functionality can then enable functionality associated with the feature symbol in another element, such as by marking a feature marking-type to a second element that is adjacent to the first element, the second element positioned in the same direction relative to the first element as the feature indicator is positioned relative to the first element. In various embodiments, the feature marking-type is a wild symbol attributing wild functionality to whichever element it is marked.

Specialty functionality is triggered in FIG. 1F by satisfaction of the two conditions, which is the result of the intersection of multiple random game events. In the embodiment of FIG. 1F, as well as in various other embodiments described herein, specialty functionality is triggered when an element is both marked with a feature marking-type and the element is positionally associated with a feature indicator. Specifically, element 107 is both marked with a wild symbol (feature marking) and the right side of this element is also aligned with, and proximate, the hinge feature indicator 151 (the conditions for positional association in this embodiment). Because wild symbols are randomly marked to the play area 100 and the feature indicators 150-153 (i.e. hinges) are also randomly moved within the play area 100, the triggering of bonus functionality is the result of two different random events occurring in association with the same element.

The specialty functionality of the embodiment of FIG. 1A-I, as well as in some other embodiments, enables the symbol functionality of a first element marked with a particular type of marking and positionally associated with a feature indicator for a second element, the second element for which the functionality is enabled identified based on the manner in which the feature indicator is positionally associated with the first element. For example, in FIGS. 1F-I, the feature indicator is positionally associated with the right side of element 107 (being alighted with and proximate the right side), so the element enabled with the symbol functionality of element 107 (specifically, wild symbol functionality) is element 108. Element 108 is to the right of element 107, which is the same direction with which the feature indicator 151 was positionally associated with element 107 (the right side). Therefore, the extension of symbol functionality (via marking) as part of the specialty functionality extends to the next element in the same (right) direction relative to element 107.

Figure 1H:
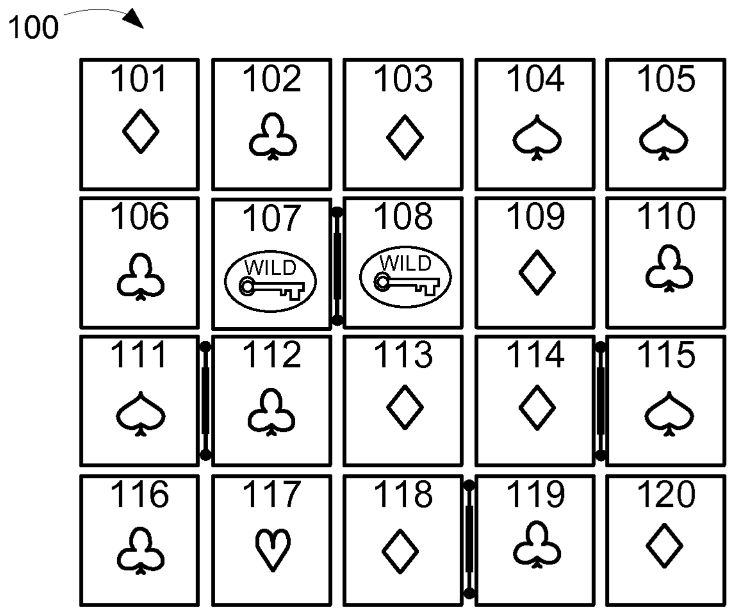

Such specialty functionality can be presented in terms of the hinge theme used to illustrate game play, as though the key symbol unlocked the door and the hinge allowed the door to flip open and pivot around the feature indicator hinge, underscoring the specialty functionality being triggered based on the intersection of two random events. In this way, the door opens in the direction of the hinge. The door can be the face of the element that triggered the specialty functionality. The specialty functionality that is triggered by the conditions met in FIG. 1F employ the hinge theme of the feature indicators 150-153 shown in FIGS. 1G-H, where the face of element 107 (analogous to a door) hinges on feature indicator 151 to pivot around the feature indicator 151 and flip onto element 108 based on the marking of wild symbol (key) and positioning of the feature indicator 151 (door) in association with element 107. As shown in FIG. 1H, the clubs symbol of element 108 has been replaced by duplication of the wild symbol of element 107, such that both elements 107 and 108 have wild functionality. In this way, the door opens to cover the adjacent symbol, pivoting with the feature indicator as a hinge. The door and/or other doors could continue to open/pivot in a chain reaction, as will be discussed elsewhere herein. The original marking of the element that triggered the specialty functionality (e.g., the wild-key marking of element 107) can remain and be used for forming combinations of corresponding elements.

Figure 1I:
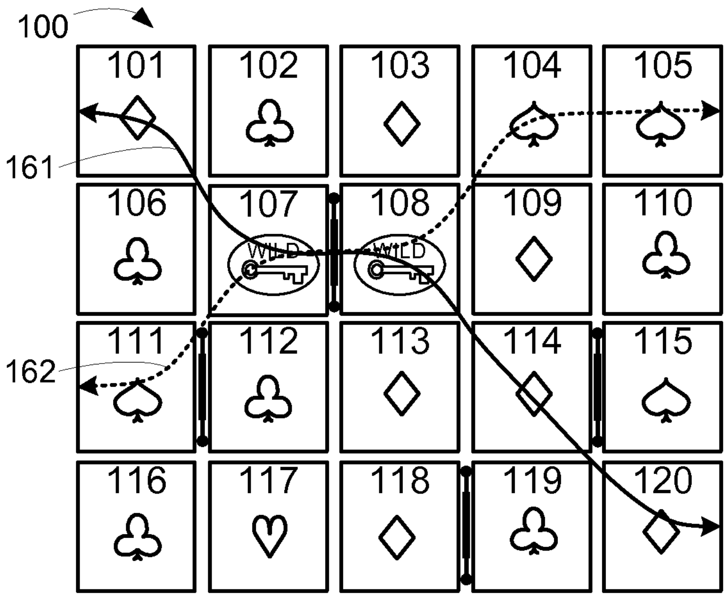

FIG. 1I shows that two winning combinations of corresponding elements have been created by the specialty functionality extending wild marking and functionality to element 108 from element 107. Solid line 161 traces a first series of adjacent elements 101-107-108-114-120 having corresponding markings (all marked with a diamond or wild symbol). Dashed line 162 traces a second series of adjacent elements 111-107-108-104-105 having corresponding markings (all marked with a spade or wild symbol). Each of these winning combinations can trigger a second payout according to a pay table. These payouts can then be added to the first payout associated with the winning combination traced by line 160 in FIG. 1D to form a total payout for the game.

FIGS. 1A-I, as well as some of the other embodiments referenced herein, show a game using the intersection of multiple randomly positioned indicators and markings to trigger gaming functions that can extend game play and/or increase the chances of triggering a payout. Conventional games typically involve a predetermined rigid path of game play. For example, conventional slot games spin 3 reels with symbols and if symbols align in some manner then a win is triggered. Regardless of presence of a win or other symbol formation, the game ends. Such games quickly become predictable and repetitive, causing player interest to wane. In some embodiments of the present disclosure, the player does not know the game outcomes, let alone the course of game play because of the possibility of triggering specialty functionally that could extend functionality and extend game play for at least another round, which can involve element remarking and winning combination evaluation. At the start of each game, the player does not know how many rounds of marking and evaluation will be progressed through, but will be hopeful that different game components intersect to broaden wild markings and re-evaluate the play area for more wins. Players enjoy games that seem as though they could break in favor of the player at any time. Having different game components that must in some manner join together to trigger specialty functionality is a way to give players the impression of momentum and that large wins could be imminent. Such aspects allow a game greater opportunity to surprise a player and therefore always keep the player holding out hope for alignment of a feature marking and a feature indicator that enables specialty functionality and then turns an incomplete series of elements into a complete combination that triggers a win and a payout.

In various embodiments, it is desirable to separate in time the element marking and feature indicator positioning stages of game play. Thus embodiments would draw out the suspense of a game longer, and would avoid situations where a player has to track two separate and random events, which could be overwhelming. Increasing player excitement and anticipation makes game play more enjoyable and keeps the attention of the player for longer periods. Entertained players play longer.

It may be preferable to have feature indicators move and stop prior to populating elements with markings so that a player can independently track these events and watch for symbols being marked right next to feature indicators. For example, in some embodiments and for some users, simultaneous movement of feature indicators and selection of markings (e.g., reels spinning and hinges between the reels moving) may be confusing and difficult to track, such that performing one step before the other is preferable (e.g., stopping movement of the feature indicators before populating a grid with markings). As such, it is contemplated for each embodiment that marking selection can occur before feature indicator movement or after feature indicator movement. However, it is also contemplated that marking selection can occur simultaneously with feature indicator movement, and that these steps may start and/or stop at the same or different times.

In some embodiments, the feature indicators do not stop moving, or rarely stop moving during the course of a game, and stay in motion even while the predetermined criteria for enabling the specialty functionality are satisfied as a feature indicator moves into positional association with an element marked with a feature marking-type. In this way, the enablement of specialty functionality may be contingent on the timing of movement of the feature indicators.

Figure 2A:
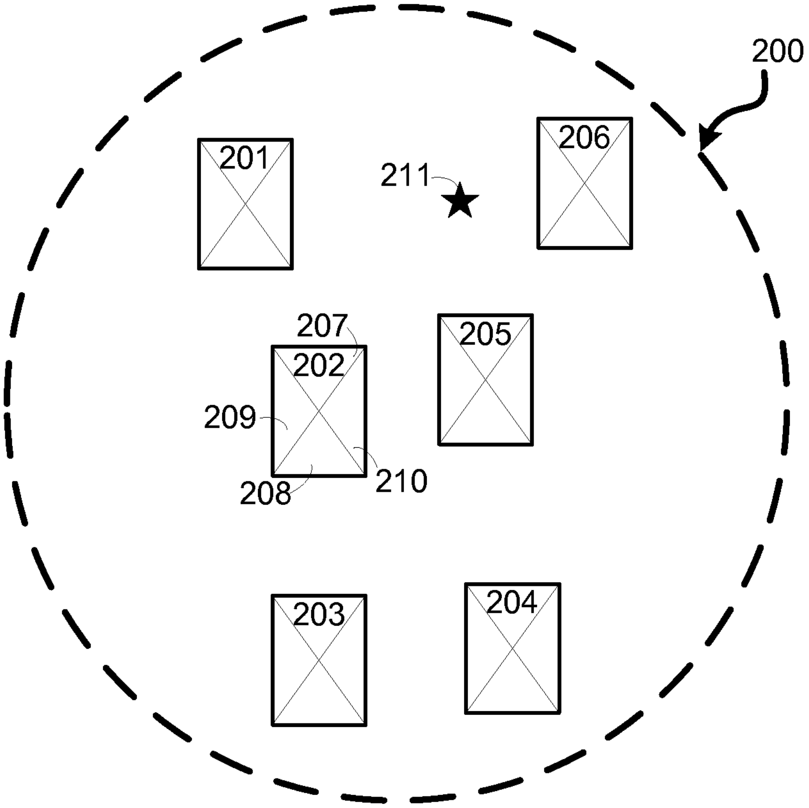
Figure 2B:
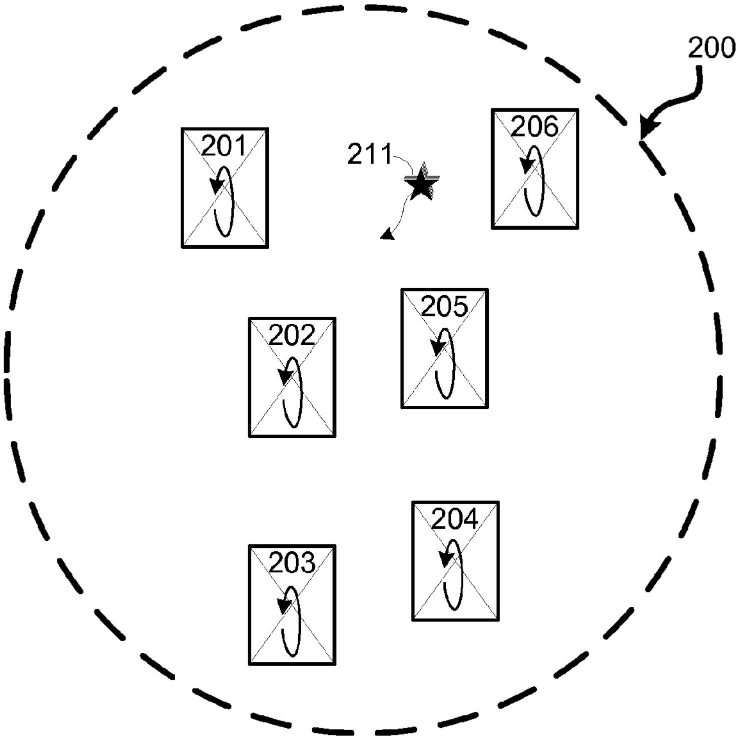
Figure 2C:
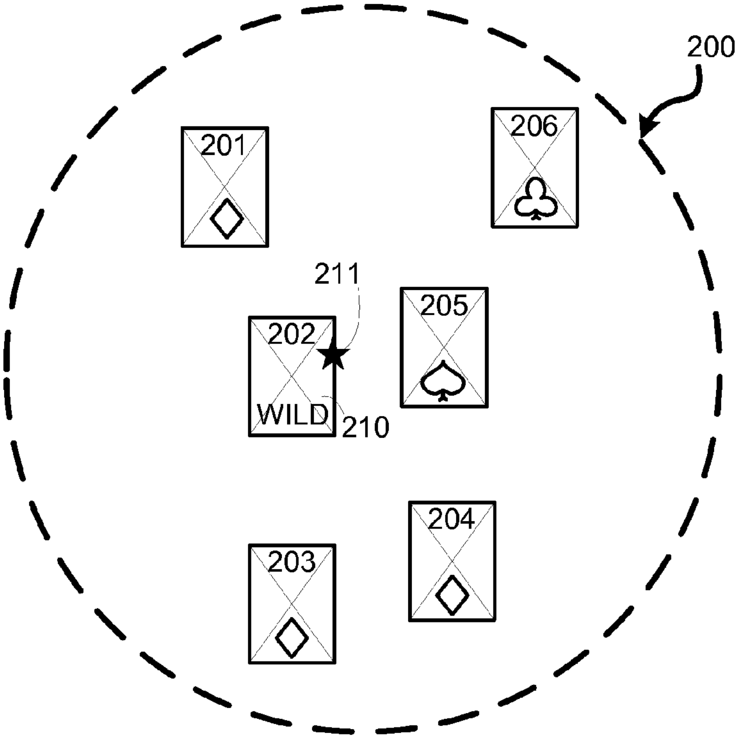

Many modifications of the game shown in FIGS. 1A-I can be made within the scope of the present disclosure. Some of the possible modifications are shown in the other figures of this disclosure. FIG. 2A illustrates a play area 200 having a plurality of elements 201-206 and a feature indicator 211. As shown in FIG. 2A, each of the elements 201-206 is divided into respective portions by an X, such that each element has a two dimensional top portion, bottom portion, left portion, and right portion covering an area of the element. For example, element 202 has top portion 207, bottom portion 208, left portion 209, and right portion 210. In the embodiment of FIG. 2A-C, the elements are divided into four portions analogous to the cardinal directions, north, east, south, and west. These portions can also be regarded as top, bottom, left, and right portions, sides, or directions, as well as up, down, left, and right portions or directions. In various other embodiments, elements share these same portions and directions, although some other embodiments have a greater number of portions and/or directions per element. For example, an element may have eight portions corresponding to eight directions, such as top, top-right, right, bottom-right, bottom, bottom-left, left, and top-left portions that respectively correspond to top, top-right, right, bottom-right, bottom, bottom-left, left, and top-left directions.

The elements 201-206 can be populated with markings and the feature indicator 211 can move within the play area 200, as shown in FIGS. 2B and 2C. As shown in FIG. 2B, the elements 201-206 are "spun" to represent selection of marking-types simultaneously with movement of the feature indicator 211. Population of the elements 201-206 can be performed in accordance with any of the ways of attributing markings to play areas referenced herein. Additionally, movement of the feature indicator 211 can be random movement (e.g., random wandering of the feature indicator within the play area 200) or the movement can be in response to random selection of a part of the play area 200 for the feature indicator 211 to move to. In some embodiments, a particular portion of an element is randomly selected for association with a feature indicator, and then based on the selection the feature indicator is moved to be positionally associated with the selected particular portion.

FIG. 2C illustrates the result of population of elements 201-206 as well as movement of the feature indicator 211. Each of the elements 201-206 has been marked with a marking-type. For example, element 202 has been marked wild, which indicates that element 202 exhibits wild functionality. In the embodiment of FIGS. 2A-D, a wild marking-type is the feature marking-type associated with specialty functionally as described herein. This means that the wild marking-type, as well as various other feature markings described herein, have dual functionality which include both corresponding to other symbols and triggering specialty functionality that extends the feature symbol functionality to another element if the necessary conditions are met. As a demonstration of the specialty functionality in the context of the embodiment of FIGS. 2A-D, element 202 has been marked wild and is positionally associated with the feature indicator 211 by the feature indicator 211 overlapping the right portion 210 of element 202. In this and other embodiments, a feature marking-type being marked to an element that is also positionally associated with a feature indicator triggers the specialty functionality, which enables the functionality associated with the feature marking-type to another element.

FIG. 2D illustrates the triggered specialty functionality. Specifically, element 202 is marked with WILD feature symbol and is positionally associated with the feature indicator 211. Therefore, the specialty functionality extends wild functionality to another element. The element to which the wild functionality is enabled is based on which direction (e.g., orientation of the portion) of the element is positionally associated with the feature indicator 211. It is the right portion 210 of element 202 that is positionally associated with the feature indicator by being overlapped. Following this directional relationship, wild functionality is enabled on an element to the right of element 202 along with a wild marking. The element to the right of element 202 is element 205, as shown. FIGS. 2A-D shows that aspects of the invention are applicable in informal grid arrangement of elements.

In some embodiments, the element or elements to which functionally is to be enabled along with addition of a corresponding marking based on specialty functionality must be in line with the direct projection of the particular side (e.g., top, bottom, left, or right) of the element with which a feature indicator is positionally associated. For example, element 205 is in line with the direct projection from the right side portion 210 of element 211. However, in various other embodiments, the element or elements to which functionally is to be enabled based on the specialty functionality need not be in line with the direct projection of the particular side (e.g., top, bottom, left, or right) of the element with which the feature indicator is associated. In such embodiments, one or more elements generally in the direction with which the feature indicator is associated could be enabled with duplicating functionality. For example, elements 204 and 206 are both to the right of element 202, which has its right side positionally associated with the feature indicator 211. In some embodiments, only one element will be enabled with feature marking-type functionality based on a feature symbol and feature indicator both being associated with the same element, and the element to be enabled can be the element that is closest to, and in the direction of, the feature indicator relative to the element marked with the feature symbol and positionally associated with the feature indicator. In FIG. 2D, element 205 is closest to, and on the right side of, element 202. If element 205 did not exist, then element 204 is closest to, and on the right side of, element 202. In such a case, it could be element 202 enabled with specialty functionality and marked with a feature symbol due to element 202 meeting the specialty functionality conditions. Proximity in this sense can be measured horizontally only, vertically only, or horizontally and vertically in various embodiments.

FIGS. 3A-D illustrate a grid 300 composed of hexagonal elements 301-307. Feature indicators 310 and 311 are illustrated as moving along the boundaries of elements within the grid 300. In the embodiment of FIGS. 3A-D, as well as in various others referenced herein, feature indicators 310 and 311 can move in any direction along the boundaries of the elements 301-307 defining the grid. FIG. 3A also shows animation in each of the elements 301-307 intended to represent random selection of a marking for each element, as if each element was cycling though various possible marking-types.

FIG. 3B shows that each of the elements 301-307 have been marked with respective marking-types and that feature indicators 310 and 311 have stopped moving. Element 303 has been marked with a feature symbol (WILD) imparting wild functionality to element 303, but also providing the opportunity to enable the same functionality and marking by extending the same functionality to at least one other element based on element 303 being positionally associated with feature indicator 311. Element 303 is positionally associated with feature indicator 311 because the feature indicator 311 is on the bottom grid line defining element 303. Because feature indicator 311 is positionally associated with the bottom of an element that is marked with a feature marking, the functionality of the feature marking, wild functionality in this case, will be enabled for another element of the grid that is in the same direction with respect to the element that is marked with the feature marking and positionally associated with the feature indicator as the feature indicator is positioned relative to the element that is marked with the feature marking and positionally associated with the feature indicator (down, in this case).

FIG. 3C illustrates that element 306 has been re-marked with a WILD symbol to show that it has been enabled with the functionality of element 303. Part of the duplicated functionality includes the ability to itself pass on the feature marking-type if the conditions for specialty functionality are again met. Such conditions are met, as shown in FIG. 3C, as element 306 is marked with a feature marking-type (WILD) and is positionally associated with feature indicator 310. Because the feature indicator 310 is positionally associated with the top-left side of element 306, element 304 (positioned above and to the left relative to element 306) will be marked for wild functionality, as shown in FIG. 3D. Specialty functionality in this way makes the game open-ended, and the specialty marking-type will continue to propagate in the grid 300 as long as the conditions for extending feature markings and functionality to adjacent elements continue to be met.

FIGS. 3A-D show how aspects of the invention can lead to propagation of specialty functionality, which can dramatically change the course of a game for a player. A player may watch in great anticipation as wild functionality is extended to many elements because of the positioning of several feature indicators. The manner of wild propagation in FIGS. 3A-D will captivate and entertain players because the game unfolds in several steps. During this time, the player may not have a sense of when the propagation of specialty functionality will end, which will provide a sense of momentum for the player. Players who feel that momentum is in their favor, as well as entertained players, will enjoy the game more and play longer. The sense of momentum also imparts a feeling of being lucky, or hitting a lucky streak, which makes players particularly likely to continue playing.

Figure 4A:
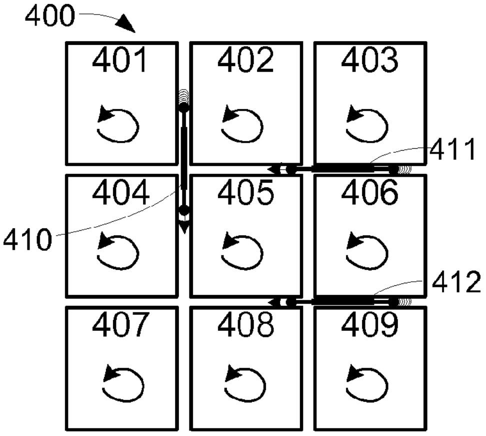
FIGS. 4A-D illustrate an embodiment of a gaming activity utilizing specialized enabling functionality in accordance with aspects of the invention.
Figure 4B:
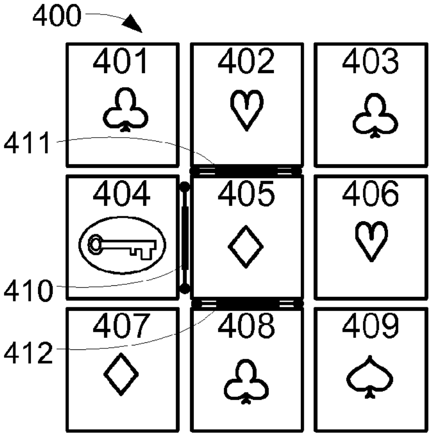

FIGS. 4A-D illustrates further aspects of the present disclosure. FIG. 4A illustrates a grid 400 composed of elements 401-409 and feature indicators 410-412. Feature indicators 410-412 are illustrated to be moving in FIG. 4A, and each element is shown to be in the process of being marked. In FIG. 4B, each of the elements 401-409 has been marked with a respective marking-type and the feature indicators 410-412 have stopped at respective positions.

Figure 4C:
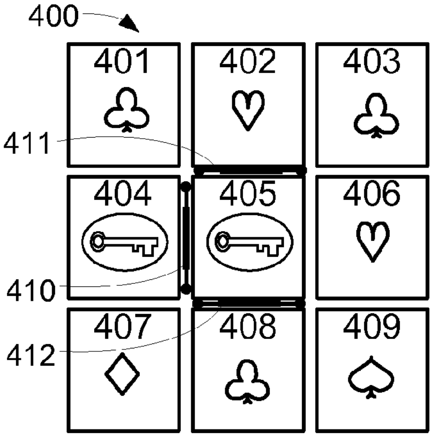

In the embodiment of FIGS. 4A-D, a key marking-type is the feature marking-type associated with specialty functionally. Element 404 has been marked with the feature marking-type and is also positionally associated with feature indicator 410, which meets the conditions for enabling another element with specialty functionality. Feature indicator 410 is positionally to the right of element 404, and therefore this same orientation will be used to select the element to be enabled with functionality of the feature marking-type by being marked with the feature marking-type. Element 405 is the next element to the right of element 404, so element 405 is re-marked with the feature marking-type (key marking) of element 404, as shown in FIG. 4C.

Figure 4D:
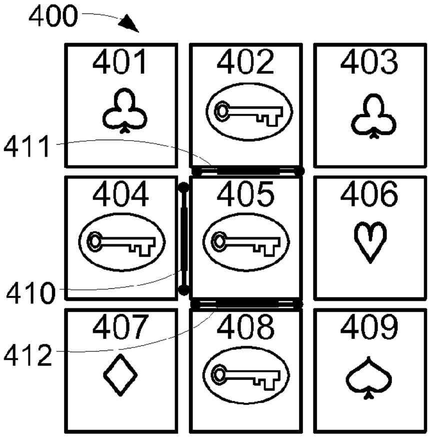

Because of the positioning of the feature indicators 410-412, the specialty functionality and feature marking-type will continue to propagate, this time in two different directions. Element 405 is both marked with a feature marking (key marking) and is positionally associated with two feature indicators 411-412. Therefore, the wild functionality associated with the feature marking will be enabled for two more elements by marking these elements with the feature marking. FIG. 4D shows that elements 402 and 408 have been marked with key markings. These particular elements 402 and 408 are marked in this way because these elements 402 and 408 are respectively positioned above and below element 405, which are the same directions with which the feature indicators 411-412 are positionally associated with element 405.

Figure 5A:
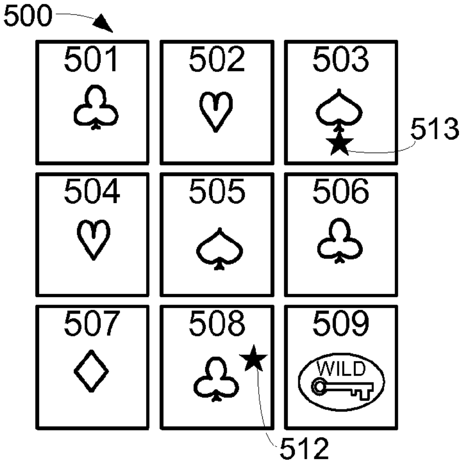
FIGS. 5A-B illustrate an embodiment of a gaming activity utilizing specialized enabling functionality in accordance with aspects of the invention.
Figure 5B:
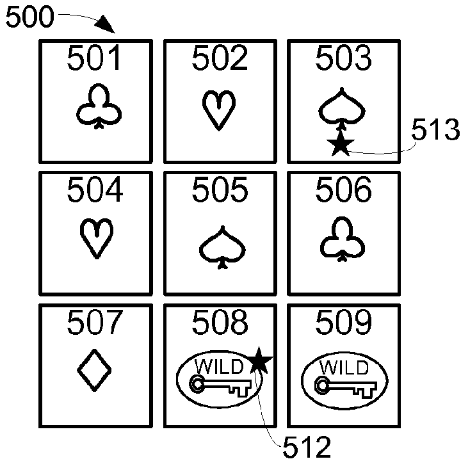

FIGS. 5A-B illustrate various aspects of the present disclosure. FIG. 5A shows a play area 500 composed of a grid of elements 501-509. The elements 501-509 of the play area 500 have been marked with markings. In particular, element 509 has been marked with a feature marking-type, which in the particular embodiment of FIGS. 5A-B is a key marking indicating wild functionality. A feature indicator 512 has also been located in the play area 500. According to the rules of the embodiment of FIGS. 5A-B, which various other embodiments share, the feature indicator 512 has been positionally associated with the left portion of element 509. The feature indicator 512 is positionally associated with left portion of element 509 even though the feature indicator 512 is not located on element 509, but rather on an adjacent element. In this embodiment, a feature indicator is positionally associated with a particular portion of an element if the feature indicator is positioned on an adjacent portion (adjacent to the element marked with the feature symbol) of a proximate element. For example, feature indicator 512 is positioned on the right side of element 508, which is adjacent to the left side of element 509. The conditions for enabling specialty functionality here requires both an element to be marked with a feature marking-type (in this embodiment a key symbol imparting wild functionality) and to be positionally associated with a feature indicator. Element 509 satisfies these conditions, and because the feature indicator 512 is positioned to the left relative to element 509, the specialty functionality will re-mark the adjacent element to the left of element 509. Accordingly, FIG. 5B shows element 508 being marked with a key marking to represent the change in functionality of this element 508.

It is noted in FIG. 5A-B that a feature indicator 513 is positionally associated with element 506. However, element 506 is not marked with a feature marking-type. Therefore, specialty functionality is not invoked, which otherwise would have marked element 503 with a feature marking.

Figure 6A:
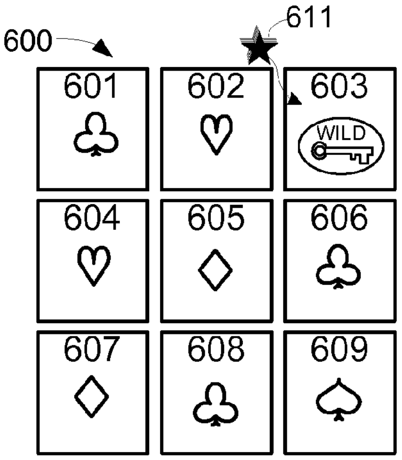
FIGS. 6A-F illustrate an embodiment of a gaming activity utilizing specialized enabling functionality in accordance with aspects of the invention.

FIGS. 6A-F illustrate various aspects of the present disclosure. FIG. 6A shows a play area 600 composed of a grid of elements 601-609. The elements 601-609 of the play area 600 have been marked with symbols. In particular, element 603 has been marked with a feature marking-type, which in the particular embodiment of FIGS. 6A-F is a key symbol indicating that the element has wild functionality.

Figure 6B:
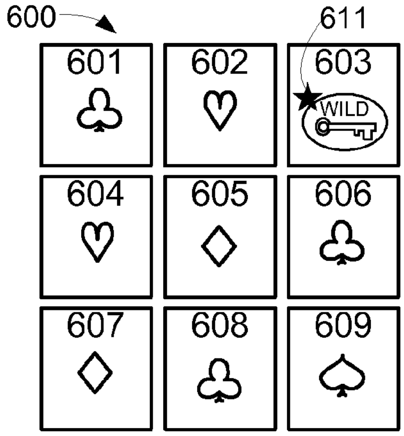
Figure 6C:
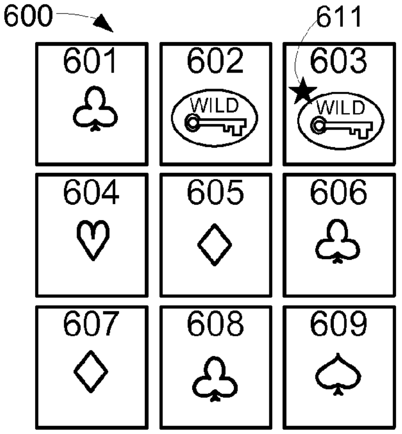

In the particular embodiment of FIGS. 6A-F, the elements 601-609 are populated with marking symbols before one or more feature indicators are positioned in association with one or more of the elements 601-609. In such a case, the markings for the elements 601-609 may be randomly selected and then respective positions for each of the feature indicators, such as feature indictor 611, can be randomly selected from all available positions. FIG. 6A shows feature indicator 611 in motion and FIG. 6B shows that the feature indicator 611 has stopped on the left side of element 603. The combination of element 603 being marked with a feature marking (key symbol) and having feature indicator 611 positionally associated with the element 603 triggers enabling the functionality of the feature marking (wild functionality) to the element adjacent to the element meeting these conditions and located in the same direction as the feature indicator 611 is positioned relative to the element 603. This means that wild functionality will be enabled for element 602, as shown in FIG. 6C.

In the particular embodiment of FIGS. 6A-F, there is a chance that one or more feature indicators will be added to the play area 600 whenever the specialty functionality of the game re-marked the feature marking-type for an element based on the meeting of the specialty functionality conditions described in connection with FIGS. 6A-B (i.e., a feature indicator can be spawned for each triggering of the specialty functionality). In some embodiments, a feature indicator can be positioned to be associated with any element after the functionality of an element has been changed by marking and/or re-marking (e.g., after the marking of element 602 with the key symbol, a random number generator is used to select a position for feature indicator 612 in the play area, which in this case is the bottom of element 602 of FIG. 6D).

In some other embodiments, a feature indicator can be positioned to be associated with an element after the functionality of that element has been changed, such as by using some probability function to determine whether a particular element will have a feature indicator positionally associated with it after the element was re-marked and enabled with a feature marking-type. For example, after the marking of element 602 with the key symbol, a random number generator is used to provide a one in five chance that a feature indicator will appear anywhere on element 602. If the use of the random number generator determines that a feature indicator will be added in association with element 602, then another use of the random number generator can determine where on the element 602 the feature indicator will be placed (e.g., equal chances for top, top-right, right, bottom-right, bottom, bottom-left, left, and top-left portions).

Element 602 is both marked with a key symbol and is overlapped by feature indicator 612, which means that the specialty functionality conditions for enabling the functionality of element 602 in element 605 have been met. FIG. 6E further illustrates how specialty functionally can be propagated throughout the play area 600. Element 605 has been marked with a key symbol based on the specialty functionality conditions being met in element 602. After this marking, an opportunity is provided for one or more feature indicators to be added to the play area 600, and in some cases a particular chance for a feature indicator to be added to element 605. As shown in FIG. 6F, two feature indicators 614 and 613 have been added to element 605. Feature indicator 613 is positioned so as to cause element 606 to be marked with a wild symbol.

Feature indicator 614 is positioned to be associated with the bottom-left of element 605. In some embodiments, wild functionality will be enabled for element 607 because it shares the relative orientation with respect to element 605 as element 605 and the feature indicator 612. Not all embodiments will extend functionality in a diagonal direction, however. In some embodiments, a feature indicator will be considered to be positionally associated with the bottom and left side of element 605, which would cause elements 604 and 608 to each be enabled with wild functionality associated with a key symbol-type.

Figure 6D:
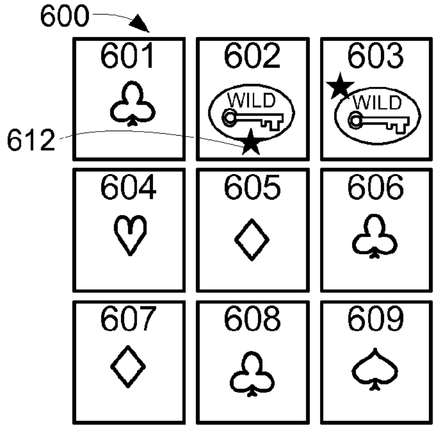
Figure 6E:
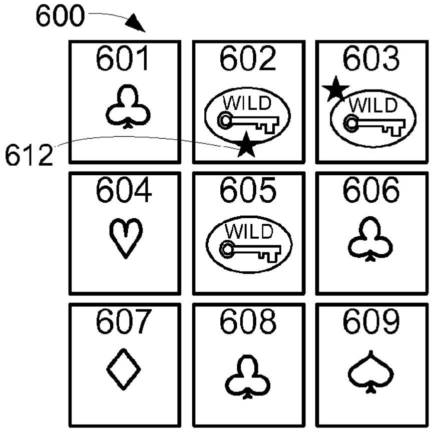
Figure 6F:
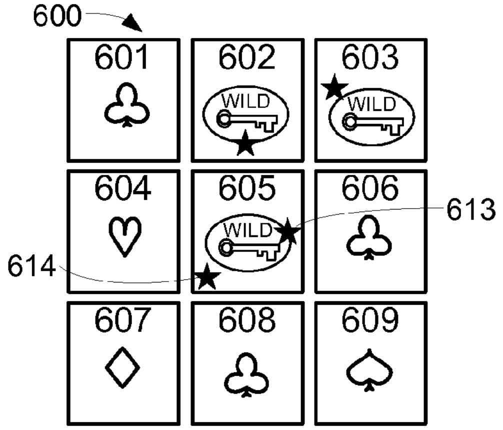

FIGS. 6A-F illustrate a scenario where each re-marking of an element with a feature marking-type was followed by the re-marked symbol being positionally associated with a feature indicator. However, it might not always be the case that a feature indicator is added for each re-marking, or to each re-marked element. For example, FIG. 6D shows that feature indicator 612 was just added to the play area 600 because element 602 was re-marked with the feature marking-type due to element's 603 satisfaction of specialty functionality conditions. However, had a random number generation action come out differently, then element 602 might not have had a feature indicator added to it, which would have ended the propagation of feature marking-types. Such an event could have been based on a random number generator and/or similar component determining that no feature indicators will be added to the play area 600, or that no feature indicator will be added to element 602 specifically. Had a feature indicator been added to the bottom of element 603, then feature marking-type propagation would have continued.

FIGS. 6A-F demonstrate how the adding of feature indicators during the course of game play can make the game open-ended (by way of a chain reaction). Players often enjoy open-ended games because the player does not know when the game will end, and typically a longer game corresponds with the addition of more feature symbols (e.g., wild symbols) which are associated with more frequent and larger payouts. Moreover, such open-ended game play can give the player the impression of momentum as multiple elements are re-marked as wild symbols, which makes players feel particularly lucky and game play more enjoyable.

In the embodiment of FIGS. 6A-F, each invocation of specialty functionality provides an opportunity for one or more feature indicators to be added to the play area 600. The addition of feature indicators increases the odds of forming winning combinations by providing opportunities for more wild markings to be added to the play area 600. Therefore, the probability of adding feature indicators can be changed to change the probability of forming winning combinations triggering payouts and control the overall chance of a player winning. Different areas of a play area can have different weightings for the addition of feature indicators, such as the columns of vertically oriented elements having different probabilities for adding feature indicators.

Figure 11A:
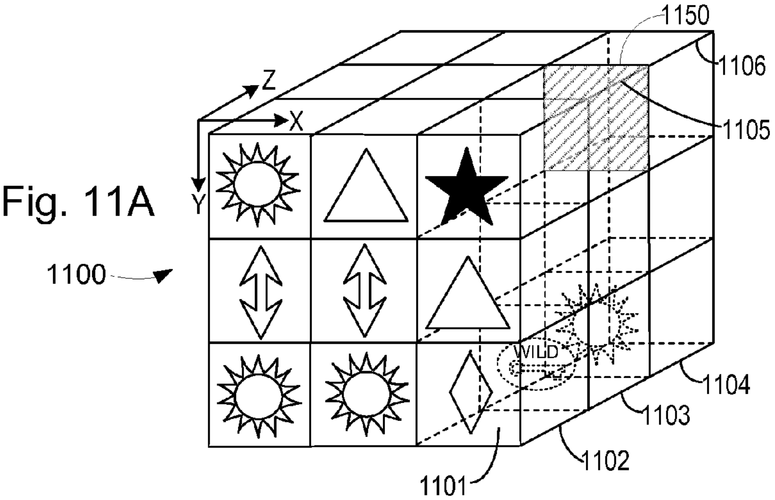
FIGS. 11A-C illustrate an embodiment of a gaming activity utilizing specialized enabling functionality in accordance with aspects of the invention.
Figure 11B:
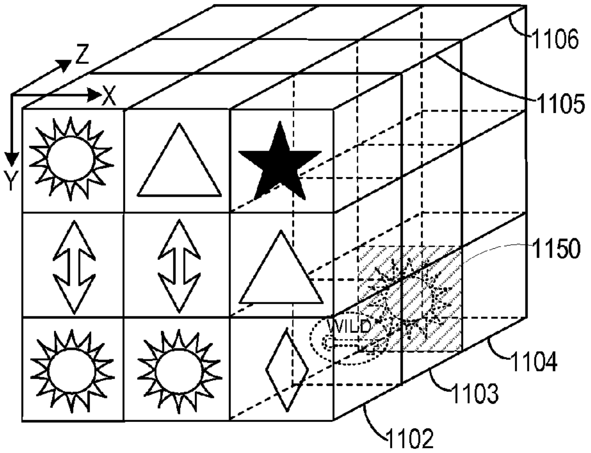
Figure 11C:
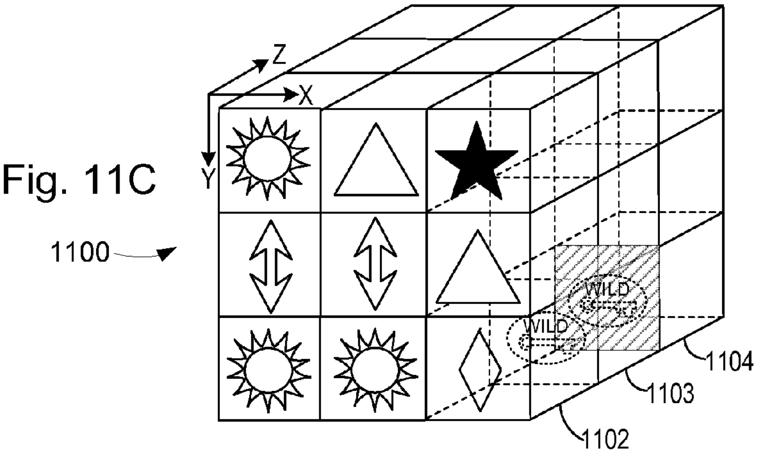

FIGS. 11A-C illustrates an embodiment of a slot gaming activity utilizing specialty functionality in a three-dimensional (3D) array. In this embodiment, rather than having the elements and markings presented in a two-dimensional array, the markings are presented on the faces of individual cube elements (e.g., elements 1102-1104), the elements forming the 3D cube 1100. The elements forming the cube are arranged along X, Y, and Z axis, three elements deep long each axis, for a total of 27 elements. For the sake of clarity and emphasis in representing features of the 3D cube 1100 embodiment, not all of these elements and/or markings are illustrated in FIGS. 11A-C, although it is contemplated that a cube or other shape of marked elements would be represented in implementation of a 3D embodiment.

In the embodiment of FIGS. 11A-C, the elements are marked with symbol-types on the respective front faces (aligned parallel with X-Y plane) of the elements in the 3D cube 1100. For example, element 1102 is marked on its face 1101 with a diamond symbol. The faces of all of the elements, and thereby the elements, can be marked in any manner referenced herein. Other parts of the elements could alternatively or additionally be marked, such as other faces (e.g., bottom, top, back, left side, and/or right side), and/or the interior of the elements could be marked with one or more symbols.

The results of marking in FIG. 11A can be evaluated for winning combinations. In various embodiments, winning combinations of corresponding markings formed within the 3D cube 1100 can be determined using any rules referenced herein being extended to a 3D environment. For example, a winning combination of markings can extend along the Y-X plane (as in 2D embodiments), X-Z plane, and/or Y-Z plane. An evaluation for winning combinations can be done for the 3D cube marking results in FIG. 11C, in addition to, or as an alternative to, evaluation of the game stage of FIG. 11A.

FIG. 11A also shows a feature indicator 1150. Feature indicators in FIGS. 11A-C are represented as darkened squares positioned between the elements of the 3D cube

1100. Feature indicators in the embodiment of FIGS. 11A-C can move between the cube elements in similar fashion to how feature indicators of other embodiments referenced herein move along and/or between elements, with the addition of movement along the Z axis. In this embodiment, a feature indicator is positionally associated with a cube element when the feature indicator is proximate and aligned with a face of the cube element. For example, in FIG. 11A, feature indicator 1150 is positionally associated with the back of element 1105 and the front of element 1106. Although FIG. 11A shows that feature indicator 1150 is aligned parallel with the Y-X plane, feature indicators can align with the other planes, such as X-Z, and Y-Z planes. In some embodiments, a feature indicator can only move along the plane in which it is aligned parallel (e.g., feature indicator 1105 aligned parallel with the Y-X plane could only move in a manner maintaining this alignment), however in various other embodiments feature indicators can move in different planes (e.g., if feature indicator 1105 were to move parallel along the Y-Z or X-Z planes).

FIG. 11B shows that feature indicator 1150 has moved downward along the Y axis, from between elements 1105-1106 to between elements 1103-1104. Element 1103 is marked with the feature marking (a key symbol indicating wild and possible specialty functionality). The specialty functionality conditions are satisfied in association with element 1103 because element 1103 is both marked with a feature-type marking and positionally associated with a feature indicator, which means that the feature marking-type will be duplicated to an adjacent element having the same orientation with respect to element 1103 as the feature indicator 1150 has with element 1103. Specifically, the feature indicator 1150 is behind element 1103 as the feature indicator is further along the Z axis than element 1103. The element that is adjacent to, and behind, element 1103 is element 1104. Element 1104 is shown as marked with a feature marking in FIG. 11C. In FIG. 11C, a winning combination is formed by corresponding elements 1102-1104, these elements corresponding based on each having the functionality to correspond to a diamond marking-type.

Various 3D embodiments, such as that shown in FIGS. 11A-C, can be modified in any manner discussed herein. In some embodiments, 4 directions are available for each face of each element marked with a feature marking and positionally associated with a feature indicator for causing the re-marking of a feature marking-type in or on another face and/or element. In some embodiments 8 directions are available for a total of 48 directions for each element cube.

Figure 12A:
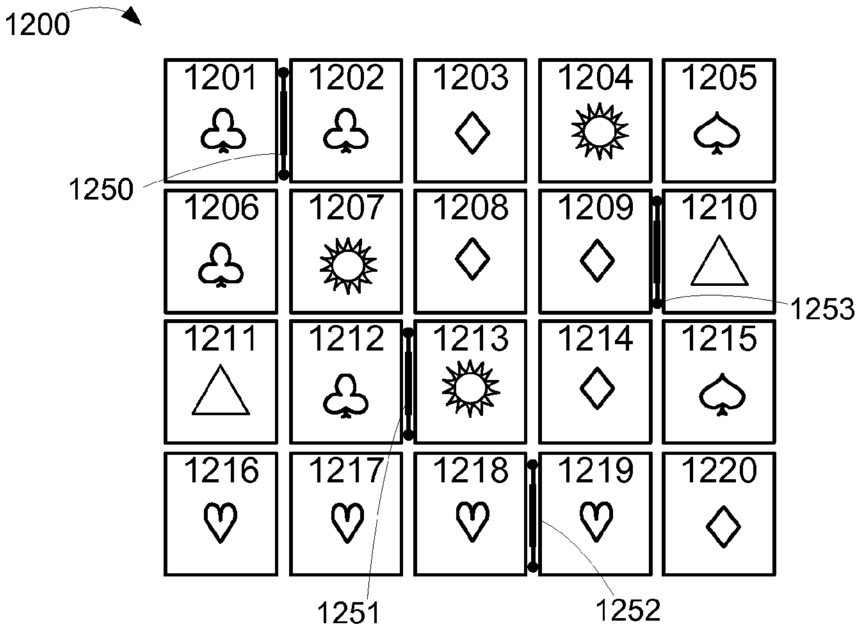
FIGS. 12A-D illustrate an embodiment of a gaming activity utilizing specialized enabling functionality in accordance with aspects of the invention.

FIGS. 12A-D shows a gaming embodiment where specialty functionality can complete a winning combination of elements having common markings. FIG. 12A shows a play area composed of a grid 1200 of elements 1201-1220, the elements 1201-1220 being marked with symbols. In the embodiment of FIGS. 12A-D, an adjacent series of five commonly marked elements is needed to trigger a win. Elements 1216-1220 would complete such a series but for element 1220 being marked with a diamond symbol (all elements 1216-1220 are marked with heart markings except element 2220). Therefore, elements 1216-1219 represent a near-win.

Figure 12B:
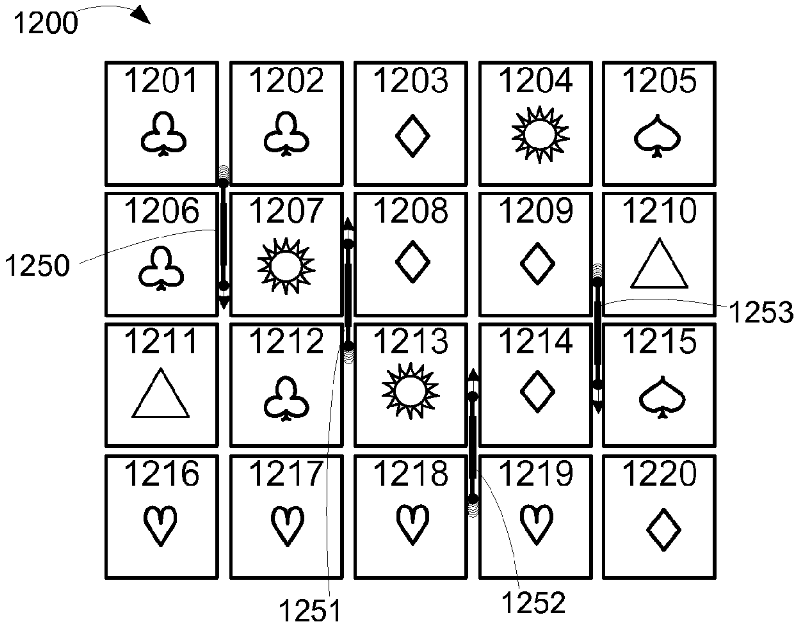
Figure 12C:
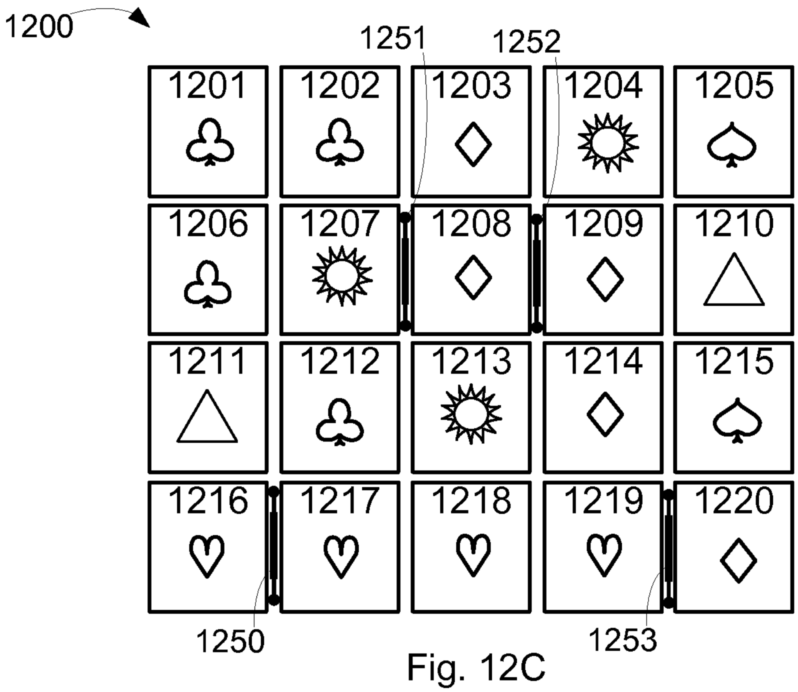
Figure 12D:
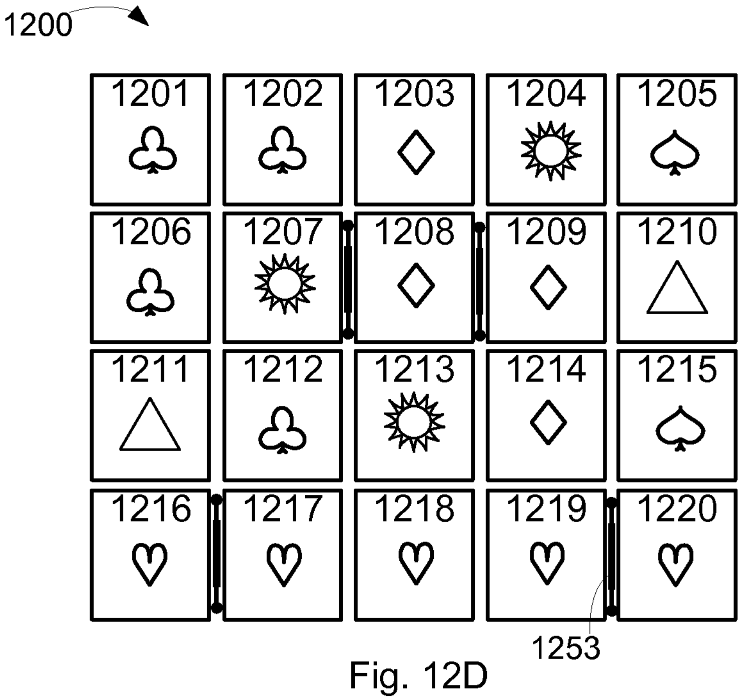

The embodiment of FIGS. 12A-D also shows feature indicators 1250-1253. The feature indicators 1250-1253 move between the vertically orientated columns of elements, as shown in FIG. 12B. The feature indicators 1250-1253 are shown in FIG. 12C to have stopped moving at respective locations. Feature indicator 1253 is located between elements 1219 and 1220. Elements 1219 and 1220 also represent the point at which the near-win series of commonly marked elements 1216-1219 stopped just short of forming a series of five commonly marked elements to trigger a win. However, element 1219 is proximate and adjacent to feature indicator 1253, which can trigger specialty functionality under these conditions. Specifically, element 1219 can complete a winning combination of elements if its marking were to be extended to element 1220, element 1219 is also positionally associated with feature indicator 1253, and the element 1220 that would complete the series is positioned in the same direction with respect to element 1219 as the feature indicator 1253 is positioned with respect to element 1219. Therefore, the marking-type of element 1219 (heart) can be duplicated in element 1220, completing a series of five corresponding adjacent elements 1216-1220 and triggering a win, as shown in FIG. 12D.

Various embodiments directed to using near-wins and feature indicators to trigger specialty functionality and complete a winning series, as shown in FIGS. 12A-D, can be modified in any manner discussed herein. For example, the elements 1201-1220 can be represented in the other manners referenced herein, the feature indicators 1250-1253 can move and function in any way referenced herein, and winning combinations can be of any type referenced herein.

Although FIGS. 12A-D illustrate an example where triggering of specialty functionality is used to complete the end of a near win to create a win, other uses are contemplated. For example, if element 1220 had originally been marked with a heart symbol but element 1219 had not, then the feature indicator 1253 could have caused the heart symbol of element 1220 to be re-marked to element 1219, completing a series of corresponding markings by filling in a middle element with a feature marking to an adjacent element on the other side of a feature indicator.

As shown in various illustrated embodiments, the feature indicator moves within the play area during the course of game play, before, during, and/or after element marking. In some embodiments, a feature indicator moves only one spaced once each round of game play. In this way, a feature indicator can only move a limited distance each time it is relocated during a game, which may be more than one element space in some other embodiments (e.g., 2 or more, but still a fixed travel distance). In some embodiments, feature indicators can only move in one direction along grid lines (e.g., only vertically or only horizontally). In some embodiments, feature indicators can move in any direction (e.g., vertically and horizontally), as long as each feature indicator still moves along grid lines that define the elements. In some embodiments, movement of feature indicators is unconnected with grid lines, and a feature indicator can move in any direction, including diagonally. In some embodiments, a feature indicator can move to areas in which the feature indicator is not associated with any elements (e.g., such as in FIG. 2A, feature indicator 211 is not positionally associated with any of the elements 201-206). In some embodiments, a feature indicator will always be associated with at least one element, the reason for this being that the feature indicator only moves along grid lines of the elements, ensuring that the feature indicator cannot go to an area unassociated with an element.

FIGS. 13A-F demonstrate, among other things, that feature indicators can be along the sides of a play area, as well as inside the play area. Elements 1301-1320 of FIG. 13A can be arranged in vertical reel strips, such that elements 1301-1306-1311-1316 represent a first of five reel strips, elements 1302-1307-1312-1317 represent a second of five reel strips, and so on. Feature indicators 1330-1335 represent hinges that move vertically along the reel strips. Feature indicator 1331 moves vertically between the reel strips of elements 1301-1306-1311-1316 and elements 1302-1307-1312-1317.

Feature indicator 1330 is not between two reel strips, but can move vertically along the outside of the reel strip formed by elements 1301-1306-1311-1316. Feature indicator 1333 is not between two reel strips, but can move vertically along the outside of the reel strip formed by elements 1305-1310-1315-1320. While various embodiments presented herein have a feature indicator stop between two elements, one of these two elements having a feature marking (e.g., wild feature symbol), to enable specialty functionality for the other element (e.g., the element not marked with the feature marking is then marked with the feature marking), the embodiments of FIGS. 13A-14B show how a feature indicator may stop alongside an element marked with the feature marking and thereby enable specialty functionality for a non-adjacent element (or an element that is adjacent by way of wrap-around continuity linking opposing sides of a play area). Specifically in FIGS. 13A-F, the triggering of specialty functionality wraps around the play area 1300 to enable specialty functionality for an element on the opposing side of the play area 1300.

Figure 13A:
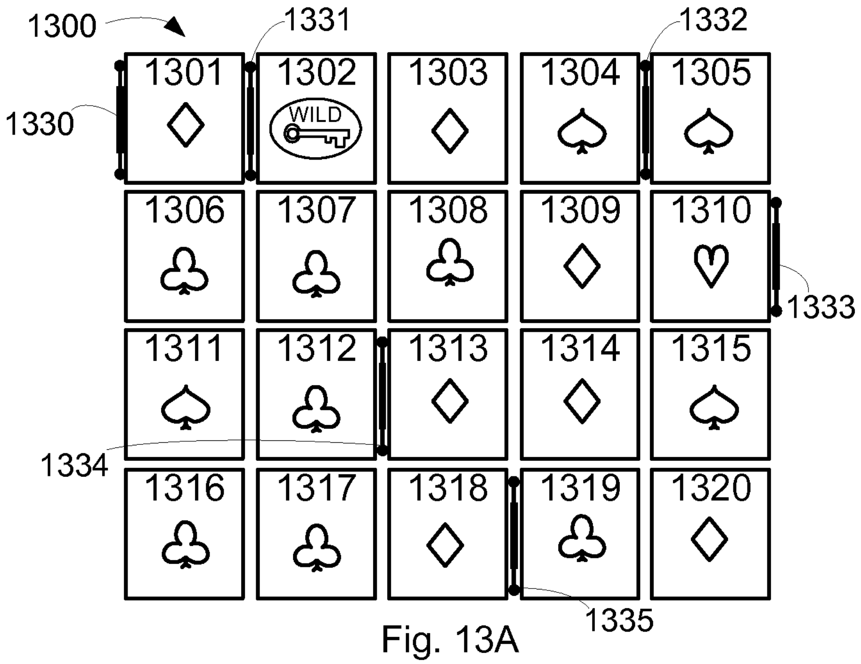
FIGS. 13A-F illustrate an embodiment of a gaming activity utilizing specialized enabling functionality in accordance with aspects of the invention.
Figure 13B:
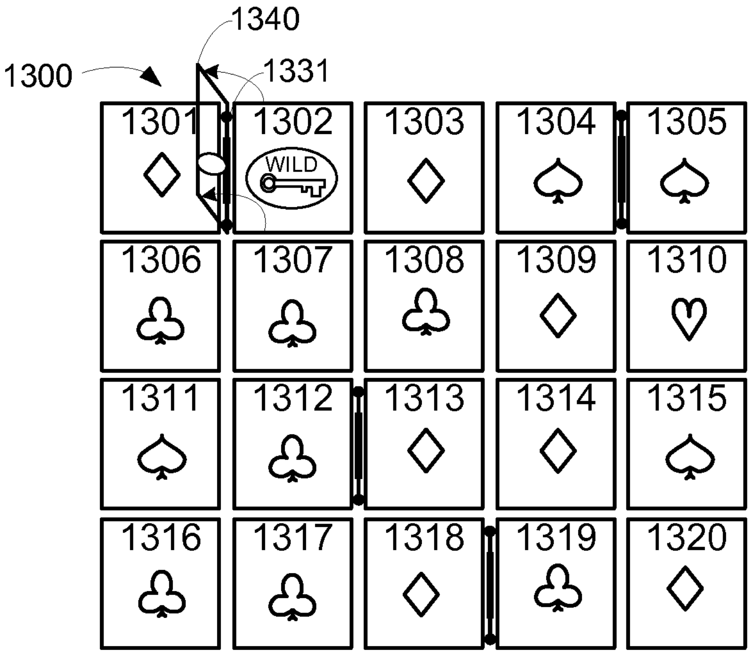

FIG. 13A shows the result of elements 1301-1320 having been marked and the feature indicators 1330-1335 having been randomly located, which can occur by any technique and in any order presented herein. Element 1302, marked with a feature marking wild-key symbol, is in positional association with feature indicator 1331 (the feature indicator 1330 being alongside element 1302) and therefore the predetermined criteria for triggering the specialty functionality is satisfied. Based on this triggering of specialty functionality, and the feature indicator 1331 being along the left side of element 1302, the face of element 1302 is shown to pivot like a door around the hinge of the feature indicator 1331 and open toward element 1301, as shown in FIG. 13B.

Figure 13C:
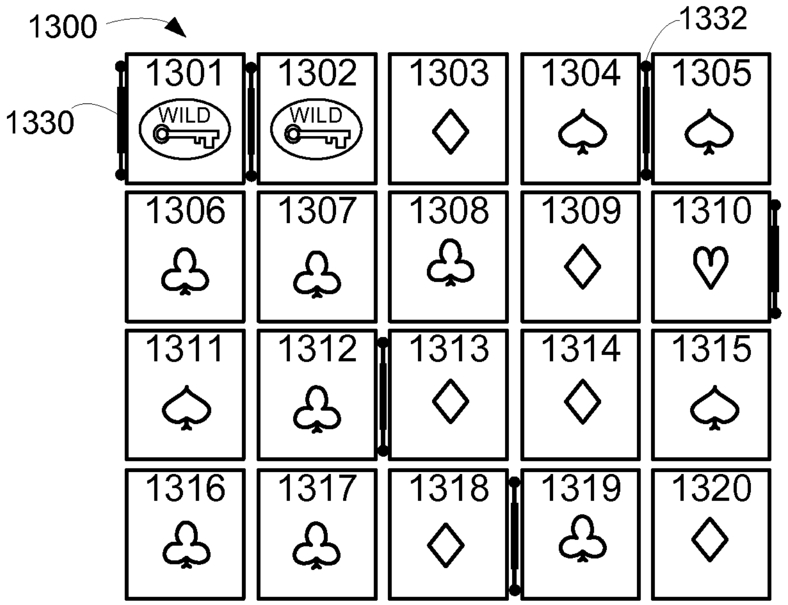
Figure 13D:
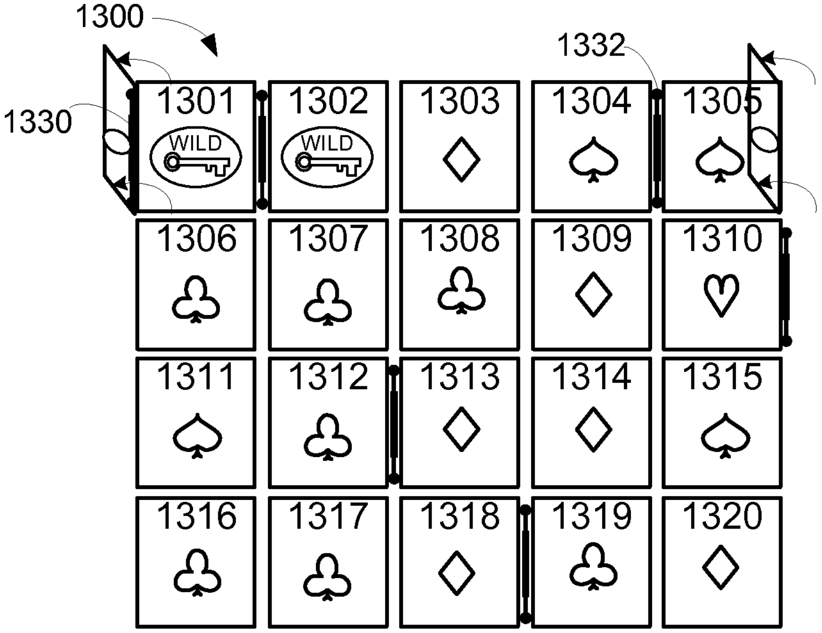
Figure 13E:
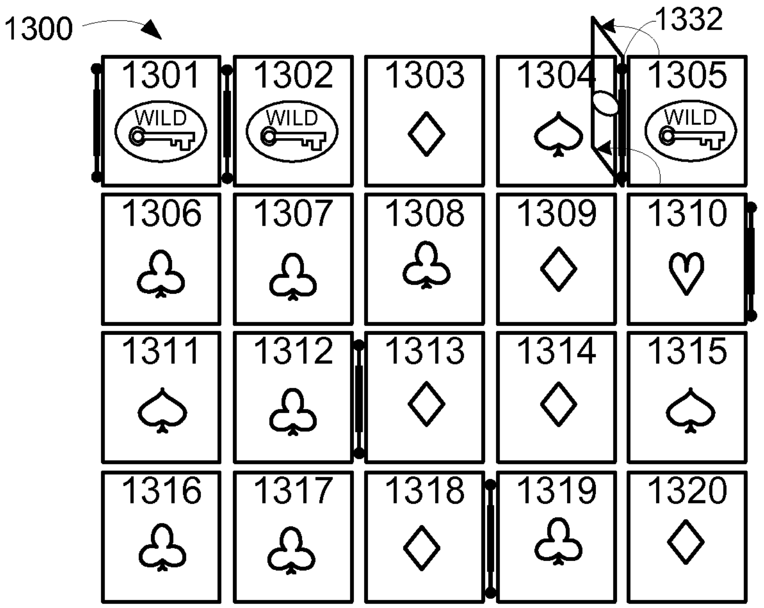

FIG. 13C shows the result of element 1302 satisfying the predetermined criteria for triggering specialty functionality, as element 1301 has been marked with a feature marking of the key-wild-type. Now being marked with a feature marking, element 1301 also satisfies the predetermined criteria for triggering specialty functionality because feature indicator 1330 is alongside element 1301 and therefore positionally associated with this element. Feature indicator 1330 is to the left of element 1301, which would in many embodiments cause another element to the left of element 1301 to be marked with a feature marking. However, in the illustration of FIGS. 13A-F, some feature indicators are side feature indicators and do not have elements on opposing sides. As such, various embodiments, including the embodiment of FIGS. 13A-F, extend the specialty functionality to an opposing side of the grid, as though the door opening and extension of specialty functionality extends around the grid. As such, FIG. 13D illustrates the face of element 1301 pivoting like a door about the hinge feature indicator 1330 to the left while also appearing on the right side of the play area 1300 to close on element 1305. As FIG. 13E shows, this action resulted in element 1305 being marked with a feature marking key-wild symbol. As element 1305 also now satisfies the predetermined criteria for triggering specialty functionality, because element 1305 has been marked with a feature marking key-wild symbol and is positionally associated with a feature indicator 1332 alongside element 1305, specialty functionally is triggered to mark element 1304 with a feature marking key-wild symbol.

Figure 13F:
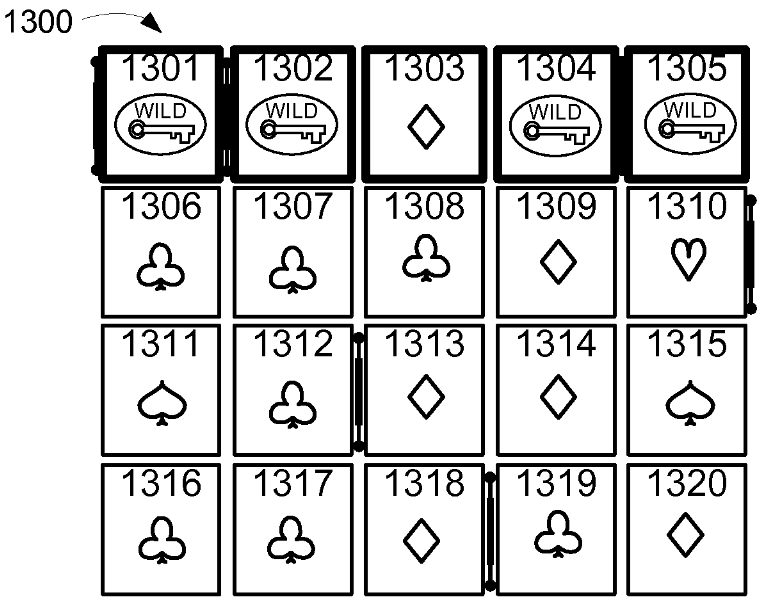

FIG. 13F shows the result of the chain reaction of specialty functionally propagating feature markings to wrap around the top of the reels and form at least one series of correspondingly marked adjacent elements 1301-1302-1303-1304-1305, corresponding to a win (as highlighted).

The embodiment of FIGS. 13A-F demonstrates how specialty functionally can be extended to an element in the same row but in a column that is on the other side of a grid. In various other embodiments, such as where feature indicators can move along the top and/or bottom of a grid, then specialty functionally can be extended in similar fashion to an element in the same column but in a row that is on the other side of a grid (e.g., top to bottom or bottom to top). For example, if a feature indicator was positionally associated with element 1318 by being along the bottom of this element, and this element was also marked with the feature marking, then the satisfaction of such predetermined criteria could cause element 1303 to be marked with a feature marking. If embodiments having such wrap-around capabilities are combined with an embodiment where each triggering of specialty functionality provides a chance to spawn a feature indicator (such as in FIGS. 6A-F), then there exists the potential for snake-like propagation of feature markings (e.g., wild or other bonus symbols) over much of a play area, which is an event that would be greatly anticipated by a player and that could draw out in a thrilling sequence as doors or other animation shows the propagation. As such, the concepts and features of FIGS. 13A-F, as well as the other concepts and features referenced herein, can be combined with the other embodiments presented herein to make different games that utilize specialty functionality in different ways.

Figure 14A:
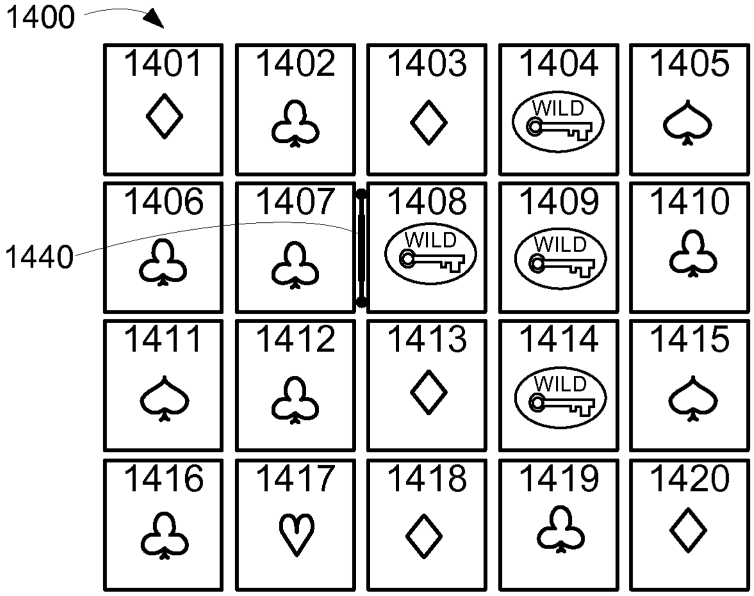
FIGS. 14A-B illustrate an embodiment of a gaming activity utilizing specialized enabling functionality in accordance with aspects of the invention.
Figure 14B:
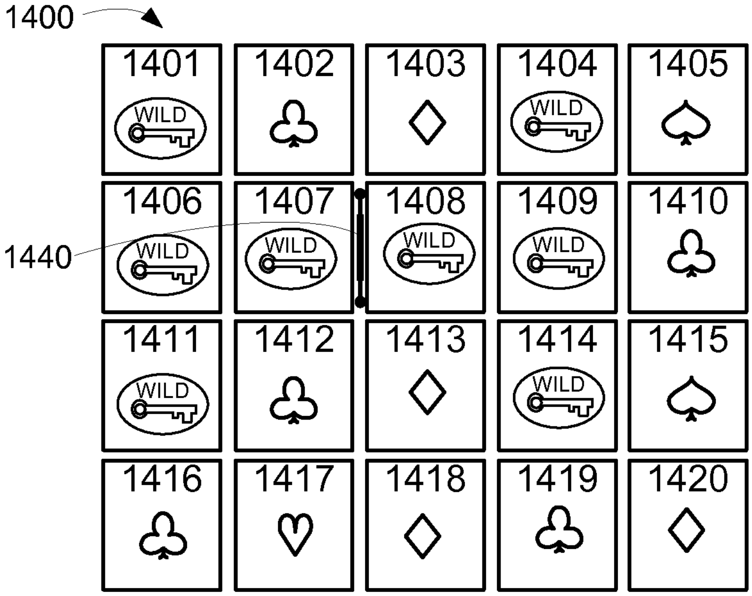

FIGS. 14A-B show how markings of a greater portion of a play area can be extended, duplicated, and/or moved to another area of the play area based on a single feature indicator. FIG. 14A shows the result of elements 1401-1420 having been marked and the feature indicator 1440 having been randomly located, which can occur by any technique and in any order presented herein. Elements 1404, 1408, 1409, and 1414 are marked with a feature marking-type (wild-key symbol). While some other embodiments presented herein require an adjacent relationship to satisfy the positional association criterion between a feature indicator and a feature marking to trigger the specialty functionality, some other embodiments, such as that of FIGS. 14A-B, do not require such adjacency, and only require the presence of a feature indicator and a feature marking. In such embodiments, the relative position of one or more elements marked with feature markings and a feature indicator are used to determine which one or more elements will be marked with feature markings based on specialty functionality in a way that maintains the relative positioning.

For example, in the embodiment of FIGS. 14A-B, the elements marked with feature markings (wild-key symbols in this case) pivot about the feature indicator 1440, such that an element marked with a feature marking above the feature indicator will cause another element on the other side and above the feature indicator to be marked with a feature marking, an element marked with a feature marking in the same row as the feature indicator will cause another element on the other side and in the same row as the feature indicator to be marked with a feature marking, and an element marked with a feature marking below the feature indicator will cause another element on the other side and below the feature indicator to be marked with a feature marking. Moreover, the distance of each element marked with a feature marking from the feature indicator is used to determine which element on the other side of the feature indicator will be re-marked with a feature marking. For example, an element adjacent to an feature indicator that is marked with a feature marking will cause an element on the other side of the feature indicator that is adjacent to the feature indicator to be re-marked with a feature marking (e.g., element 1408 causes element 1407 to be re-marked as shown in FIG. 14B). An element in the same row but two element spaces away from a feature indicator that is marked with a feature marking will cause an element in the same row but two element spaces over on the other side of the feature indicator to be re-marked with a feature marking (e.g., element 1409 causes element 1406 to be re-marked).

An element marked with a feature marking, but not in line with the feature indicator (i.e. not in the same row or column) and not adjacent to a feature indicator, can nevertheless cause another element to be marked with a feature marking. In such a case, these marked elements can pivot about the feature indicator to create a mirrored pattern of marking with the feature markings. FIG. 14B demonstrates this, as element 1404 caused element 1401 to be re-marked, element 1408 caused element 1407 to be re-marked, element 1409 caused element 1406 to be re-marked, and element 1414 caused element 1411 to be re-marked. This can be performed by representative flipping those elements as group or section on one side of a feature indicator to pivot about the feature indicator and indicate which elements on the other side of the feature indicator will be re-marked, the positional relationship of the feature markings maintaining their relationships relative to the feature indicator as a group. As such, entire portions of a play area can be duplicated as a mirror pattern on the other side of a feature indicator by triggering of specialty functionality.

Markings that could be duplicated on the other side of a feature indicator through triggering of specialty functionality include any adjacent marking, any adjacent markings with a special marking such as a sub-symbol, any adjacent elements sharing a boundary (such as a wall or corner), markings of the same rank (where different marking-types have different ranks), any marking that would benefit from being duplicated, or any groups of markings meeting a predetermined pattern. In some cases, which type of marking will be subject to duplication via specialty functionality is not predetermined, and can be determined during the game by random selection between all of the available marking-types.

In some embodiments, a feature indicator is not used, and instead an arrow or another directional indicator appears in association with an element or marking, such that if the element is marked with a feature marking (e.g., a wild symbol having an arrow) then another element in the direction of the directional indicator is re-marked with the feature marking-type. For example, if element were marked with a wild feature marking and with a rightward pointing arrow as the directional indicator, then an element to the immediate right of this element can be re-marked with the wild feature marking.

FIGS. 14A-B demonstrate, among other things, that multiple elements marked with feature markings and having certain positional relationships with feature indicators can trigger specialty functionality to re-mark other elements using a single feature indicator. However, in some other embodiments, only 1 re-marking is allowed per feature indicator as each feature indicator can pair with only 1 element marked with a feature marking. In some other embodiments, only 2 re-markings are allowed per feature indicator as each feature indicator can pair with only 1 element marked with a feature marking. In some embodiments such a restriction is present because of the limited possibilities of positional association between the feature indicator and the marked elements (e.g., may require adjacency). In some embodiments, multiple elements can be marked with a feature marking and have a positional association with a feature indicator satisfying the predetermined criteria to trigger specialty functionality, but only one of those elements will cause another element to be re-marked. Such element might be the element that's re-marking will be the most beneficial for the player, and the element to be re-marked can follow the re-marking rules of FIGS. 14A-B, for example.

Figure 7:
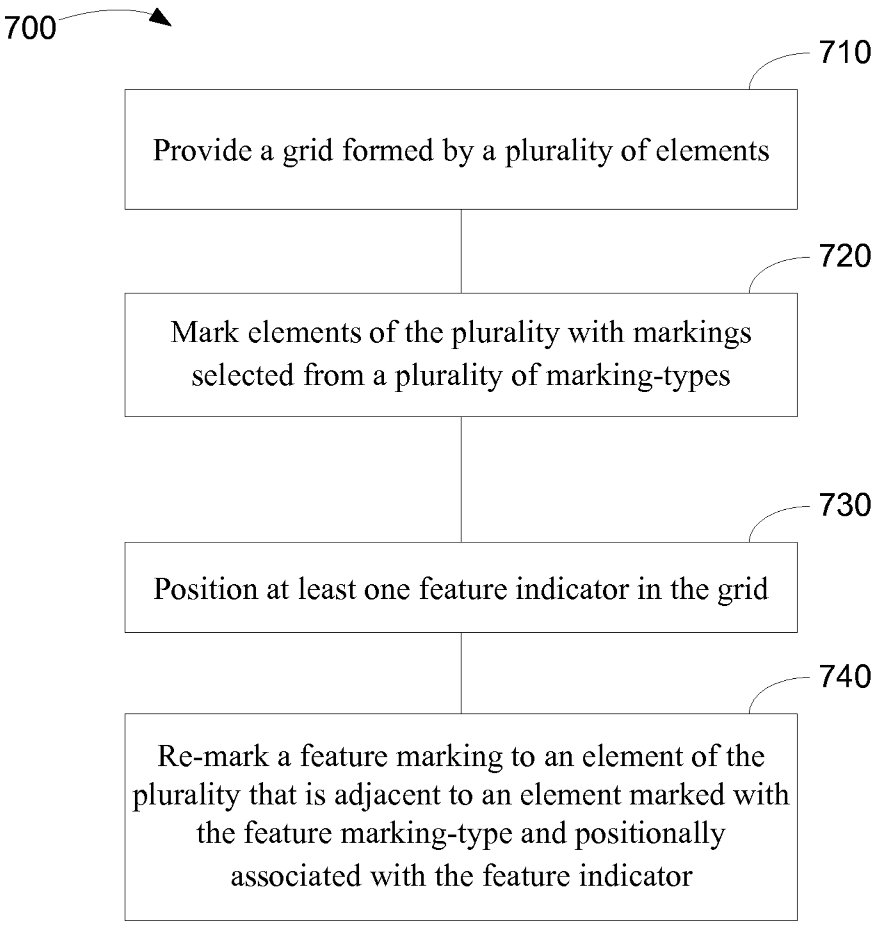
FIG. 7 is a flow diagram of an exemplary embodiment of a method for utilizing specialized enabling functionality in accordance with aspects of the invention.

FIG. 7 illustrates a flow chart of a method 700 demonstrating various aspects of the present disclosure. The method 700 includes providing 710 a play area having a plurality of elements. The play area could be a grid formed by the plurality of elements. Such a play area and elements could be those of one of the embodiments described or illustrated herein, such as FIGS. 1A-6F and 11A-12D, for example.

The method 700 includes marking 720 elements of the plurality with markings selected from a plurality of marking-types. Marking 720 can be done in any manner discussed herein, including adding a symbol-type (e.g., jack, king, queen, ace, wild, etc.) to each element of the plurality. One or more of these markings could be of a feature marking-type, such as a wild symbol. Before, concurrently, or after marking 720, at least one feature indicator can be positioned 730 in the play area.

A feature indicators can be positioned 730 such that the feature indicator is positionally associated with an element of the plurality. Further, the feature indicators can be positioned 730 such that the feature indicator is positionally associated with a particular portion (e.g., top, bottom, left, or right) of the element. The element might also be marked with a feature marking-type. If an element is both positionally associated with a feature indicator and marked with a feature marking-type, then specialty functionally can be triggered, which extends functionality to an adjacent element. Which element out of all of the adjacent elements will be re-marked 740 is dependent on the orientation of the feature indicator relative to the element marked with the feature marking. Based on satisfying these conditions, the method 700 then re-marks 740 the feature marking-type (e.g., wild symbol) to an element of the plurality that is adjacent to the element marked with the feature marking-type and positionally associated with the feature indicator. As such, step 740 is performed for each element of the plurality that is marked with the feature marking-type and positionally associated with a feature indicator of the plurality.

Several symbols can be adjacent to a symbol that is positionally associated with a feature indicator and marked with a feature marking-type, creating several candidates for re-marking 740 with the feature marking-type. In various embodiments, the adjacent element that is re-marked 740 is positionally orientated with respect to the element that is marked with the feature marking-type and positionally associated with the feature indicator in the same way (e.g., same direction) as the feature indicator is orientated with respect to the element marked with the feature marking-type. Such techniques for determining which element is re-marked 740 for feature marking functionality in accordance with specialty functionality are discussed further herein in connection with FIGS. 1A-6F and 11A-12D.

Based on the marking 710 and re-marking 740, an outcome based on one or more combinations of the symbols can be determined, just as identifying winning combinations of symbols from the marking 710 and the re-marking 740.

Steps 730 and 740 could be repeated, as in some embodiments (e.g., FIGS. 6A-F) there is a chance that a position indicator will be added for each marking 720 and re-marking 740, which would continue positioning 730 and re-marking 740 until a round of positioning 730 and re-marking 740 failed to satisfy the specialty functionality conditions.

Figure 8:
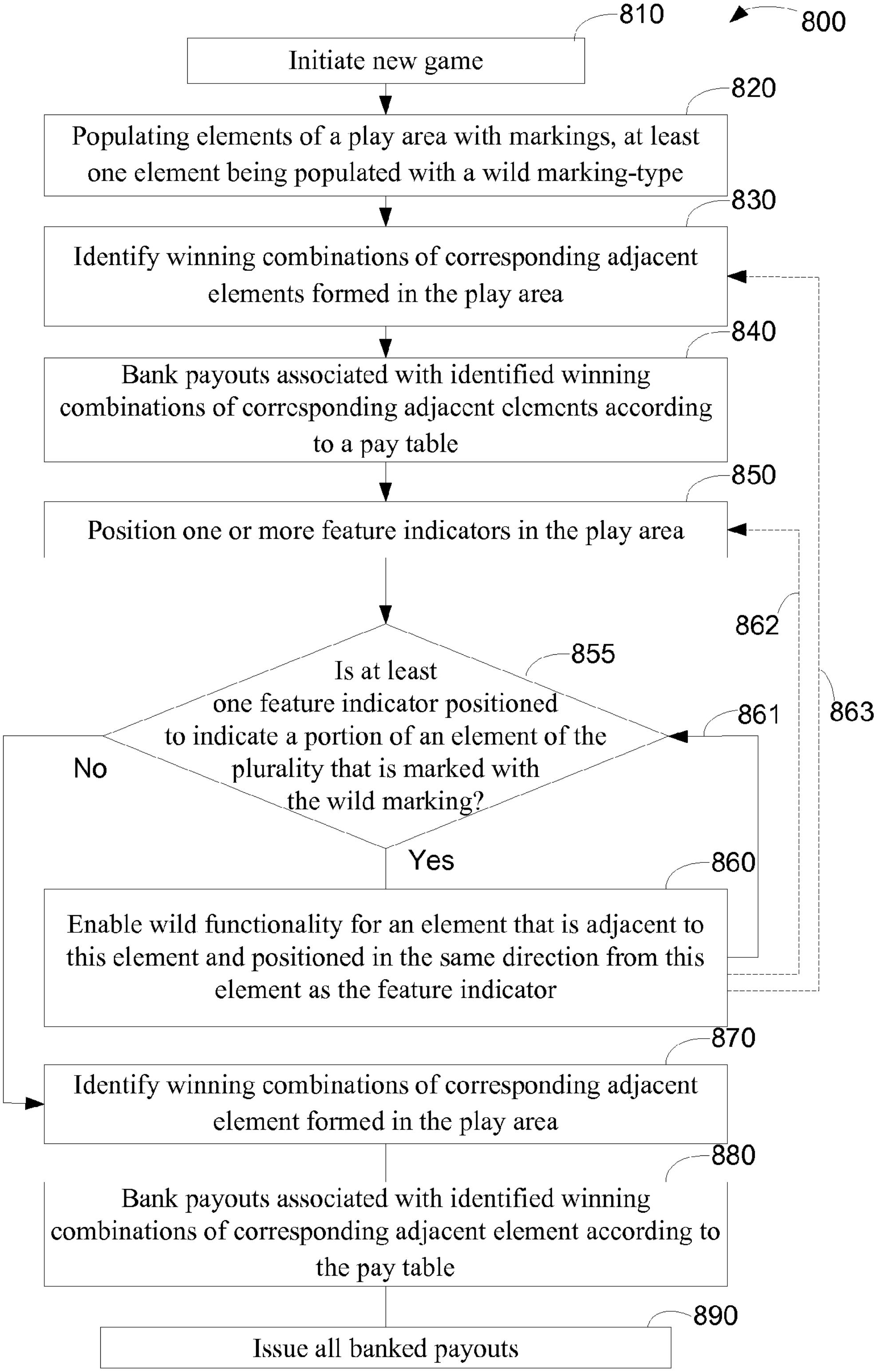
FIG. 8 is a flow diagram of an exemplary embodiment of a method for utilizing specialized enabling functionality in accordance with aspects of the invention.

FIG. 8 illustrates a flow chart of a method 800 demonstrating various aspects of the present disclosure. The method 800 includes initiating 810 a new game. Initiating 810 a new game can include clearing a play area of markings and/or resetting feature indicators. A game may be initiated 810 based on a wager, in which the wager is placed at stake, pending the outcome of the game.

Upon initiation, the method 800 populates 820 elements of a play area with markings (e.g., symbols). The marking for each element is randomly selected from a plurality of marking-types, which includes a wild marking-type. In this method 800, the wild marking-type is the feature marking associated with specialty functionality. A wild marking may not be marked to the play area each time the game is played because the markings are randomly selected from marking-types and there is a chance that this marking-type will not be selected. However, for some game play rounds at least one of the markings populated 820 to the play area will be of the wild marking-type.

Based on the marking-types associated with the elements, one or more winning combinations of corresponding adjacent elements formed in the play area can be identified 830. Formation of winning combinations can be done in any manner referenced herein. Elements can correspond because of the marking-types with which each is marked (e.g., a series of corresponding adjacent elements each marked with a common marking-type or a wild marking-type). For each identified 830 winning combination, a payout is banked 840.

The method 800 continues by positioning 850 one or more feature indicators in the play area. The feature indicators might already be present in the play area before being moved into the one or more positions. The feature indicators might not be present in the play area up to this point in the method 800, and therefore appear in their positions during this step. Although not consistent with the way the steps of the method 800 are arranged, in some alternative embodiments, steps 820 and 850 are performed concurrently or step 850 is performed before step 820.

As discussed herein, the movement of the feature indicators in step 850 may be along grid lines, along linear paths, not over elements, over elements, and/or in wandering fashion having no rigid path. After the one or more feature indicators are positioned 850, it is evaluated whether at least one feature indicator is positioned to indicate a portion of an element of the plurality that is marked with the wild marking-type 855. These are the triggering conditions discussed herein for triggering specialty functionality, which enables functionality of the feature marking-type (wild in this method 800) in an element that was not marked as wild in the populating 820 step.

For example, the conditions of step 855 may be met in various embodiments if one of the feature indicators is adjacent to one of the elements marked with a wild marking-type. In some embodiments, the conditions of step 855 are met when one of the feature indicators is overlapping a portion of one of the elements marked with a wild marking-type. In either case, the conditions of step 855 may be met when one of the feature indicators is positionally associated with one of the elements marked with a wild marking-type.

If the conditions of step 855 are not met, then the method 800 identifies 870 winning combinations of corresponding adjacent elements formed in the play area. Step 870 can be performed in the same manner as step 830 (e.g., same rules for correspondence between elements). Step 870 may only identify winning combinations of elements that have not already been identified, such as by ignoring those combinations already identified in step 830 or in a previous performance of step 870.

If the conditions of step 855 are met, then wild functionality is enabled 860 for an element that is adjacent to the element that is positionally associated with one of the elements marked with the wild marking-type, which can include re-marking of the feature marking-type (in this case wild marking-type) to the element being enabled. Note that not all elements adjacent to the element that is positionally associated with one of the elements marked with a wild marking-type is enabled with wild functionality. Rather, the only element that is enabled 860 is the adjacent element that is positioned in the same direction with respect to the element that is positionally associated with a feature indicator and marked with a wild marking-type as the feature indicator is positioned with respect to the element that is positionally associated with the feature indicator and marked with the wild marking-type.

For example, if an element is marked with a wild symbol and has a feature indicator positionally associated with the top of the symbol (e.g., is aligned and adjacent the top of the element), then wild functionality is enabled 860 for the element that is immediately above that element (e.g., the element that is aligned with and adjacent to the top of the element). This enablement 860 occurs for each element meeting the conditions of step 855.

After functionality enablement 860 of one or more elements, the method 800 can evaluate whether at least one feature indicator is positioned to indicate a portion of an element of the plurality that is marked with the wild marking-type 855 for which another element has not already been changed in functionality (enabled 860). For example, step 855 will not be satisfied by an element marked as wild and having one feature indicator positioned to indicate a portion of the element if that element has already satisfied these conditions in step 855 to trigger enabling 862 of wild functionality for an adjacent element using the same feature indicator. However, the conditions of step 855 may be satisfied in such a case if a new feature indicator is added or re-positioned (e.g., a subsequent round of step 850 adds or re-positions a feature indicator), and the new or re-positioned feature indicator can be relied upon to satisfy the conditions 855.

Depending on the variation of the method 800, several different paths could alternatively be taken after step 860. Path 861 will loop though steps 855 and 860 until a wild is added (in association with step 860) that is not positionally associated with a feature indicator, which fails the condition of step 855 and the method advances to step 870 which identifies 870 winning combinations of corresponding adjacent elements formed in the play area which might have been created since step 830 by enablement 860 of wild functionality for one or more elements. Any payouts associated with additional winning combinations from step 870 can be banked 880 according to a pay table and then all banked 840 and 880 payouts issued 890 to the player.

If path 861 is used, then the method 800 generally corresponds to the embodiments of FIGS. 1A-I which, as illustrated, do not add or reposition feature indicators once positioned 850. However, it is noted that the embodiment of FIGS. 1A-I could be modified in accordance with any variation discussed herein, including following path 862 or 863.

If path 862 is alternatively used after step 860, then the method 800 positions 850 one or more feature indicators in the play area after functionality enablement 860 (e.g., another feature indicator is added which might be positionally associated with a newly added wild symbol). In some embodiments, the return to step 850 causes a re-positioning of the feature indicators that were previously positioned. In some other embodiments, step 850 represents an opportunity for one or more additional feature indicators to be added to the play area. The opportunity can be a probability (e.g., one out of five) of a feature indicator being added to the play area or a feature indicator being added to a particular element, such as for each element for which wild functionality was just enabled 860 as in FIGS. 6A-F. The method 800 then returns to see if the conditions of step 855 are satisfied after the enablement 860 of wild functionality and feature indicator re-positioning/addition 850 since the last evaluation of step 855. In this way the method 800 can loop through steps 850-855-860, adding and/or repositioning one or more feature indicators (or at least having a chance to add or reposition) each time wild functionality is enabled 860. Such a variation of this method 800 generally corresponds to FIGS. 6A-F.

If path 863 is alternatively used then the method identifies 830 any additional winning combinations after each enablement 860 of wild functionality, which has the effect of drawing the game out longer and highlighting new winning combinations for the player.

Figure 15A:
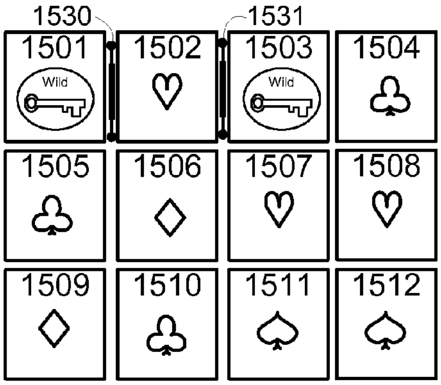
FIGS. 15A-C illustrate an embodiment of a gaming activity utilizing specialized enabling functionality in accordance with aspects of the invention.
Figure 15B:
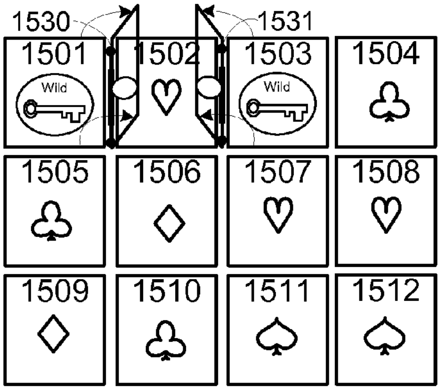
Figure 15C:
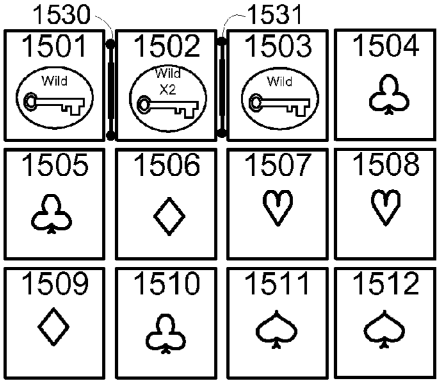

FIG. 15A shows a play area with elements 1501-1512 having been marked and feature indicators 1530 and 1531 having been located, which can occur by any technique and order presented herein. Under some circumstances an element could be twice marked with feature markings. FIGS. 15A-C illustrate an example where element 1502 is between two feature indicators 1530 and 1531 and further between two elements 1501 and 1503 that are each marked with feature marking-types (Wild-Key symbols in this embodiment). Each of the elements 1501 and 1503 therefore satisfy the predetermined criteria for enabling specialty functionality and re-marking element 1502 with feature markings, as shown with the door swings of FIG. 15B.

While a player may like the idea of element 1502 being marked as wild, an element cannot become any more "wild" if twice marked as wild, as in FIG. 15B, because one wild marking already allows the element to correspond to other elements regardless of marking-type. Certain rules can be employed to still provide a player with a benefit to compensate for this doubling up of the same bonus benefit. For example, an evaluation for winning combinations can be done after a re-marking is done for each element causing a re-marking, such that two or more separate evaluations will be performed serially as an element is serially marked with different, but identical, feature markings that provide wild functionality. Another option is to have a multiplier or other bonus applied to element 1502 to account for being marked with two feature markings in the same round. FIG. 15C shows element 1502 marked with a feature marking showing that it has multiplier functionality in addition to wild functionality based on being twice marked.

Figure 16A:
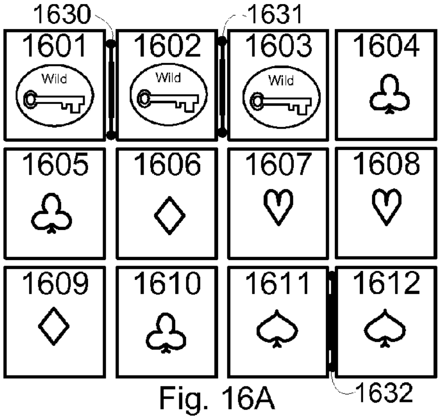
FIGS. 16A-C illustrate an embodiment of a gaming activity utilizing specialized enabling functionality in accordance with aspects of the invention.
Figure 16B:
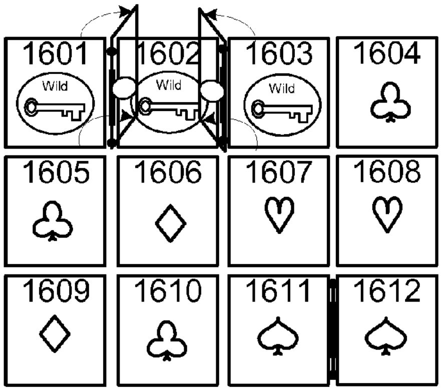
Figure 16C:
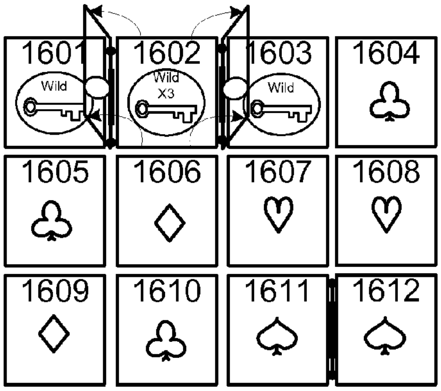

In some embodiments, each feature marking can be assigned a multiplier value of 1, such that when two are combined as in FIG. 15C, the multiplier values are added to make a multiplier value of 2×. FIGS. 16A-C illustrate a scenario where two feature markings are added to an element that was already marked with a feature marking. FIG. 16A shows the result of elements 1601-1612 having been marked and feature indicators 1630-1632 having been located along reel arrangements of the elements 1601-1612. Each of elements 1601-1603 has been marked with a feature marking-type marking and between these elements are feature indicators 1630 and 1631, such that elements 1601 and 1603 will each cause element 1602 to be re-marked with a feature marking, as shown in FIG. 16B. Likewise, element 1602 causes each of elements 1601 and 1603 to be marked with feature markings as shown in FIG. 16C. If each marking of the feature marking-type is associated with a multiplier value of 1, and if each additional marking of the feature marking-type adds to the multiplier, then elements 1601 and 1603 will each have multiplier values of X2 and element 1602 will have a multiplier of X3 (X1 as originally marked, X1 from element 1601, and X1 from element 1603). Several options exist for dealing with winning combinations that would use multiple multipliers (e.g., the wilds and clubs symbol of elements 1601-1604). A player could receive the benefit for the highest multiplier (X3 in the stage of game play following FIG. 16C), the award could be augmented by the sum of the multipliers (X8 in the stage of game play following FIG. 16C), or the award could be augmented by the product of the multipliers (X12 in the stage of game play following FIG. 16C). FIG. 16C represents numerous ways to form series of four corresponding adjacent elements.

It is noted the other values of multipliers for feature markings could be used. For example, each feature marking-type could originally have a multiplier value of X3, and the combination of two feature markings (as in FIGS. 15A-16C) could result in addition or multiplication of these values. Also, these aspects of combining the functionality of feature markings can also be used with functions other than wilds, and can be used for other bonuses and symbols (e.g., a spade symbol could be double counted for an element if twice marked).

Various embodiments could be modified such that feature indicators are attracted to certain marking-types, such as feature markings, in a play area. For example, as presented in various embodiments herein, a play area is populated with element markings before the final locations for feature indicators has been decided and/or identified. As such, the probability of feature indicators being located in positional association with elements marked with feature markings verses elements without such markings can be weighted to make it more likely that feature indicators will be in positional association with elements marked with feature markings to make enablement of specialty functionality more likely to occur. In such cases, while the enablement of specialty functionality is still the convergence of two random events (locating of feature marking and feature indicator), the probability of this occurring may be augmented to make the occurrence frequent enough to maintain player interest.

Another type of attraction that can be used comes into play after the feature indicators have been first located in a play area. In such embodiments, it can be determined at random that some or all feature indicators move one row or column closer to all being in the same row or column, thereby providing a greater chance that some or all of an entire row or column will be marked with feature markings because any feature markings already in the row or column may be duplicated and perhaps propagated. In some embodiments, it may be determined (e.g., by the appearance of a randomly marked symbol or after a predetermined number of games have been played such as 1 in every 100) to move all feature indicators to be arrayed in one row or column. Such a row or column could be the selected for this benefit based on having the most feature markings or by being determined to provide the most benefit for such an occurrence. In some embodiments, one feature indicator can move one grid space (e.g., one element space). In some embodiments, multiple feature indicators can move one grid space. In some embodiments, one feature indicator can move multiple grid spaces to align with a feature marking to trigger specialty functionality. In some embodiments, the presence of a special feature indicator (e.g., being presented by random occurrence) can cause all other feature indicators to move to the same row or column as a special feature indicator. In some embodiments, feature indicators may always move one space to attempt to align in the same row and/or column or at least be closer with other feature indicators. As shown herein, certain benefits for a player accrue by greater consolidation of feature indicators, so players may be particularly interested in moving feature indicators closer together.

In some embodiments, among the different marking-types that can be marked to a play area is a magnetic marking that can cause one or more feature indicators to move to align with the element in which the magnetic marking is placed. Such alignment could be alignment of the feature indicators proximate the element in which the magnetic marking is placed. Alignment could be alignment of the feature indicators in the same row and/or column as the element in which the magnetic marking is placed.

In some embodiments, feature indicators are enabled to have a greater tendency to align themselves next to feature markings (e.g., feature markings that also function as wilds) in positional associated to satisfy the predetermined criteria that triggers specialty functionality verses aligning with one or more elements not having feature markings. In the event that there are multiple feature markings for a feature indicator to move to, several options can be used to determine which feature marking will influence the movement of a feature indicator. In one case, a probability table can be used to determine where a feature indicator moves. In another case, a preference rule can be used whereby if another feature indicator resides next to a feature marking, then the feature indicator is moved to a location in positional association with an element having a feature marking. In another case, priority values can be assigned to each feature marking and feature markings with a higher priority get priority as a target location for a feature indicator with respect to feature markings that have lower assigned values. In another case, directional notations can be added to the feature indicators, such as a directional arrow on each feature indicator pointing in a direction of possible movement. In such embodiments, feature indicators may only be allowed to move in the direction of their respective directional notation to align with feature markings.

In embodiments where feature indicators move to align with each other, each feature indicator may lock on the reel (e.g., vertical column of elements) along which the feature indicator moves to move the elements and markings of the reel as well. This would cause some elements and symbols to be pushed out of the play area, and blank elements to be moved into the play area in a nudge. The blank elements could be filled in by specialty functionality to duplicate feature markings, other markings could be randomly selected for marking in the blank elements, or the blank spaces can be left blank during an evaluation stage (leaving the elements as a null element). Markings nudged out of the play area can wrap around to filling in blank spaces or could become apart of a separate bonus play area which can be evaluated for awards according to a paytable.

Winning combinations of elements marked with corresponding markings can be identified for any of the embodiments referenced herein (e.g., FIGS. 1A-6F and 11A-16C). Although several embodiments illustrate a winning combination as a series of adjacently located corresponding elements, other types of forming winning combinations can alternatively or additionally be used. For example, any of the embodiments referenced herein could employ scatter pay rules, where winning combinations of markings can be formed without the markings being marked to elements of an adjacent series (e.g., only a sufficient number of elements must be marked with corresponding marking-types to trigger a win, there being no requirement on how these elements must be arranged).

In various embodiments of the present disclosure, pay lines may need to be enabled for a particular game. For example, a player may be required to place a unique bet for each particular pay line. In such a case, a player not enabling all pay lines may be given the opportunity to select which pay lines will be enabled, wherein only those pay lines that are enabled can be used to form a series of corresponding adjacent elements that triggers a payout. In various embodiments, marked elements will still appear along non-enabled pay lines, but a series of adjacent corresponding elements within those series will not trigger a payout and/or trigger specialty functionality. In some embodiments, a series of adjacent corresponding elements in a non-enabled pay line may trigger specialty functionality, but not a payout. Alternatively, a series of adjacent corresponding elements in a non-enabled pay line may trigger a payout, but not specialty functionality.

The embodiments referenced herein can be modified such that the feature indicators are only enabled to trigger the specialty functionality when a certain symbol type is marked to the play area (e.g., based on random chance as part of a bonus) or an additional wager is made. The embodiments referenced herein can be modified such that the feature indicator is not originally presented in the play area, but based on random chance could be added to the play area.

Various embodiments referenced herein duplicate the feature marking and associated functionality (e.g., a wild or other symbol-type) in an adjacent element as part of enablement of the specialty functionality. However, any embodiments could be modified such that another type of marking and/or functionality is added to the adjacent element in the same manner in addition to, or as an alternative to, the feature marking-type. The added marking and/or functionality may not duplicate the marking and/or functionality of the element that triggered the specialty functionality, and may cause a different type of marking and/or functionality to be associated with another (e.g., adjacent) element. The embodiments presented herein could be modified such that the added marking and/or functionality pertains to a marking-type and functionality that is only available by meeting of the predetermined criteria to trigger specialty functionality as presented herein, such that this marking-type is unavailable to be randomly selected for element marking.

In various embodiments, the original marking of an element adjacent to an element that triggered the specialty functionality can remain while another marking is added to this element by the triggering of the specialty functionality. In this way, an element can be marked with two or more markings and can function with the benefit of all of the marking such that the element is enabled with the functionality of all of markings, or the most beneficial function of the markings. For example, element 108 in FIG. 1H could be marked with both the spade symbol that it was originally marked with as well as the wild-key symbol feature marking-type. In some embodiments, two evaluations for winning combinations of markings will be performed if an element has two markings, one evaluation for each marking, where a first one of the markings is active in the first evaluation while the second is dormant and the second marking is active in the second evaluation while the first is dormant. However, in some embodiments, only one evaluation is performed and only the marking associated with the highest payout is used for an element with more than one marking. In some embodiments, only one evaluation is performed and the functionality of all symbols is active.

The embodiments referenced herein generally employ the specialty functionality to duplicate the feature marking-type on an adjacent element, however, these embodiments could be modified. For example, instead of duplicating the feature marking-type and/or functionality in an adjacent element, the adjacent element could be skipped and the specialty functionality could mark the feature marking-type and/or enable the feature marking-type functionality for an element two elements over from the element satisfying the conditions for specialty functionality, using the same direction determination as described herein.

Various embodiments referenced herein generally keep (e.g., do not erase) the feature marking-type in the element satisfying the conditions for enabling specialty functionality. However, these embodiments could be modified such that the feature marking in the element satisfying the conditions for enabling specialty functionality is graphically removed from this element and duplicated in the adjacent element enabled with feature marking-type functionality via specialty functionality, leaving the element satisfying the conditions for enabling specialty functionality without a marking. This element can then be re-marked, or a row or column of element markings can shift to replace the marking for this element. Such re-marking could be by random selection process used to originally populate grid elements with markings, or could be of a marking-type having functionality only accessible by meeting the conditions for enabling specialty functionality. For example, continuing with the door and hinge theme used in connection with FIGS. 1A-H, the door could open from the element that satisfied the criteria for triggering specialty functionality (e.g., element 107 in FIG. 1G) to reveal a different marking when the door closes on an adjacent element (e.g., element 108 in FIG. 1G). This different marking could be a marking randomly selected from a plurality of marking-types, or could be a special marking association with special functionality that is only accessible through being revealed from behind a door (i.e., in association with triggering specialty functionality). Such marking may be associated with scatter pays, multipliers, direct payouts, or other bonus. Such marking may be associated with a premium level of marking-types which are associated with increased payouts and/or increased likelihood of forming winning combinations relative to the other marking-types used for original element marking.

Various embodiments referenced herein can be modified such that feature indicators (i.e., hinges) do not stop next to certain types of bonus markings, such as a marking-type that invokes scatter pay rules. Additionally, or alternatively, bonus markings, such as a scatter pay symbol, will not be replaced due to duplication of a feature marking from an adjacent element. Players may dislike the removal of bonus markings, such as a scatter pay symbol. In various embodiments, line pays may only evaluate and/or reevaluate new pays that result from enablement of wild functionality and remarking of an element.

The appearance and/or use of feature indicators can be variable For example, the frequency or rate of appearance of feature indicators can be subject to a certain probability for each game or round. Such probability could be variable for different rounds depending on other conditions, such as the marking of a certain symbol. The rate at which one or more feature indicators occur for a particular area (e.g., per reel) could be weighted relative or other areas.

Various embodiments referenced herein can be modified such that different types of feature indicators are included, the different types of feature indicators associated with different rules for specialty functionality. For example, one type of feature indicator can replicate a feature marking for one adjacent element through triggering specialty functionality, while another type of feature indicator can replicate a feature marking for multiple elements through triggering specialty functionality. Additionally, or alternatively, one type of feature indicator may replicate a feature marking for an adjacent element in only one predetermined direction through triggering specialty functionality, while another type of feature indicator can replicate a feature marking for an adjacent element in any direction through triggering specialty functionality.

The embodiments referenced herein generally show the feature indicators (e.g., hinges), but embodiments could be modified to have hidden feature indicators. Hidden indicators may only be revealed and/or used when an additional bet is placed, when an amount is paid for their use (e.g., paying a separate amount for the chance that that would improve an outcome), random appearance, or if they land in a certain location or next to a certain marking-type (e.g., a wild marking association with the specialty functionality as discussed herein).

In some embodiments presented, a feature indicator can be positionally associated with multiple elements. For example, in the embodiment of FIGS. 1A-I, each feature indicator can be positionally associated with two elements, and hence can be used to satisfy the predetermined criteria for triggering specialty functionality twice for each round, duplicating the feature marking in the left and right directions. In various embodiments, feature indicators can also only be positionally associated with two elements at a time and can enable duplication of the feature marking in only two directions (e.g., left and right or up and down) at a time, such as in the embodiment of FIGS. 4A-D. In some embodiments, such as 6A-F, a feature indicator can only be associated with one element at a time, and can enable duplication of the feature marking in only one direction at a time. In some modifications, feature indicators are directional, such that even though they are positionally associated with multiple elements at a time, they are only allowed to duplicate wild functionality in a particular direction according to a directional indicator on the feature indicator. For example, a feature indicator may have a leftward pointing arrow indicating that it is only able to enable specialty functionality and re-mark a feature marking to an element to the left of the feature indicator, even if an element is positionally associated with the feature indicator and is marked with a feature marking, but is to the left of the feature indicator (i.e. in that case an element to the right will not be re-marked). In some embodiments, an element may have a directional notation indicating that it is only able to enable specialty functionality and re-mark a feature marking to an element in that direction (e.g., left, or diagonally right-down). In some embodiments, an feature marking may have a directional notation indicating that it is only able to enable specialty functionality and re-mark a feature marking to an element in that direction (e.g., right, or diagonally left-up).

Figure 9:
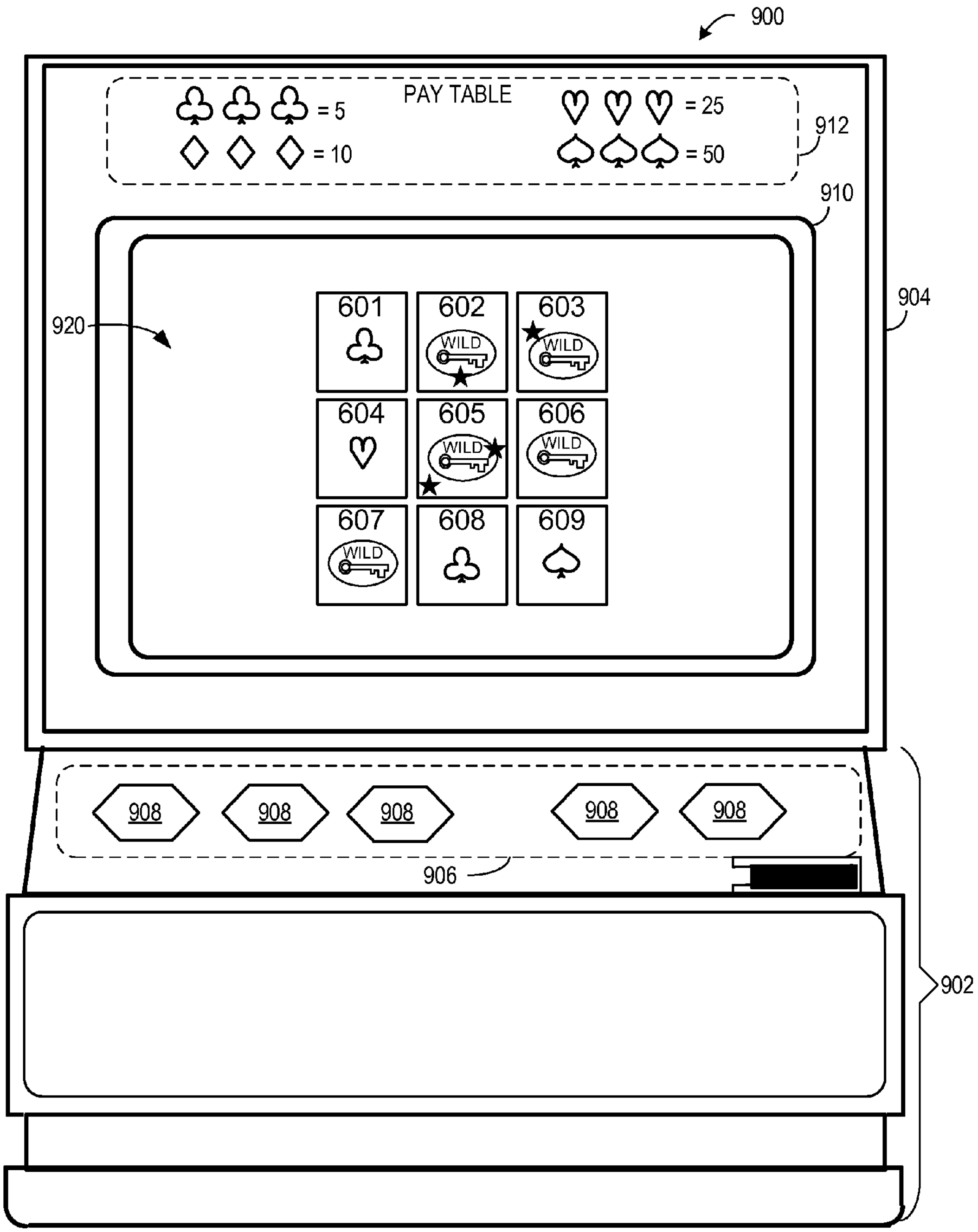
FIG. 9 is an embodiment of a casino-style gaming device in which the principles of the present invention may be applied.

FIG. 9 is an embodiment of a casino-style gaming device in which the principles of the present invention may be applied. The slot machine 900 is a structure including at least a computing system, a housing, and a display. The housing includes a base 902 and a display device 904 to allow the slot machine 900 to be a self-supported, independent structure. The base 902 includes structure supporting the slot machine 900, and also includes a user interface 906 to allow the user to control and engage in play of the slot machine 900. The particular user interface mechanisms associated with user interface 906 is dependent on the type of gaming machine. For example, the user interface 906 may include one or more buttons, switches, joysticks, levers, pull-down handles, trackballs, voice-activated input, or any other user input system or mechanism that allows the user to participate in the particular gaming activity. The user input 906 allows the user to enter coins or otherwise obtain credits through vouchers, tokens, credit cards, etc. Various mechanisms for entering such vouchers, tokens, credit cards, coins, point tickets, etc. are known in the art. For example, coin/token input mechanisms, card readers, credit card readers, smart card readers, punch card readers, and other mechanisms may be used to enter wagers. The user input may include a plurality of buttons 908, which allow the user to initiate game play, enter a number of credits to play, select options, cash out, automatically bet the maximum amount, etc. It should be recognized that a wide variety of other user interface options are available for use, including pressing a button on a gaming machine, touching a segment of a touch-screen, entering text, entering voice commands, or other known user entry methodology.

The display device 904 of FIG. 9 includes a display screen 910. The display device may take on a variety of forms depending on what type of presentation is to be provided. For example, a slot game play area 920 is provided where the slot gaming activity in accordance with the invention is displayed. The slot game play area 920 can function as the play area described herein. The video display screen may be implemented in a variety of manners, including electronically represented with outputs shown on conventional electronic displays, such as a liquid crystal displays (LCD), dot matrix, plasma, CRT, LED, electro-luminescent display, or generally any type of video display known in the art.

Various types of grids, and ways to display them, are contemplated in the scope of the invention, including vertical, horizontal, and/or diagonal lines creating spaces of rectangles and/or squares. A display grid could also be comprised of triangles, hexagons, ovals, circles and other shapes.

A grid can be presented in various ways. For example, a display grid could be comprised of several reel strips with various markings on the periphery of the reel strips. Several reel strips with a common axis placed together can form a grid, with each reel strip representing a vertical column and adjacent markings on the aligned reels representing a horizontal row. A display grid could also be printed or formed on a surface, such as a piece of paper or board. A grid could also be represented by projected light. An array could be presented, modified and used in any way that a grid could be presented.

A display grid can also be presented by use of video means, such as with a video slot machine. In a video slot machine, the reel strips are not represented by physical material, but rather include electronically stored symbol patterns, i.e., a virtual reel strip. By using virtual reel strips for each of the display series there is no physical correlation between display series as there are with mechanical reel strips. For example, in the context of mechanical reel strips, three symbols presented in a column across three pay lines are physically restricted to that particular order, since the reel strip is presented across three rows. In some embodiments, there is no such relationship and each subpart of the grid can display a marking independent of any other subpart. Furthermore, there are other advantages by using video representation, including faster game play, greater flexibility in game types and variations, and representation of things that would otherwise be physically complicated or impossible.

Associated with the display device 904 is an optional winning guide area 912, where information associated with the potential winning series lengths may be presented. This area may also provide an indication of the requisite symbols, symbol lengths, symbol combinations, symbol locations, etc. that result in winning payouts to the participant. This information may be part of the display screen 910, or alternatively may be separate from the display screen 910 and provided directly on a portion of the display device 904 structure itself. For example, a backlit colored panel may be used as the winning guide area 912. Further, this information may be provided on an entirely separate display screen (not shown). The winning guide area 912 can display pay table information, as shown.

The gaming machines described in connection with the present invention may be independent casino gaming machines, such as slot machines or other special purpose gaming kiosks, video games, or may be computing systems operating under the direction of local gaming software and/or remotely-provided software such as provided by an application service provider (ASP). The casino gaming machines utilize computing systems to control and manage the gaming activity. An example of a representative computing system capable of carrying out operations in accordance with the invention is illustrated in FIG. 10.

Hardware, firmware, software or a combination thereof may be used to perform the various gaming functions, display presentations and operations described herein. The functional modules used in connection with the invention may reside in a gaming machine as described, or may alternatively reside on a stand-alone or networked computer. The computing structure 1000 of FIG. 10 is an example computing structure that can be used in connection with such electronic gaming machines, computers, or other computer-implemented devices to carry out operations of the present invention.

The example computing arrangement 1000 suitable for performing the gaming activity utilizing enabling specialty functionality in accordance with various embodiments typically includes a central processor (CPU) 1002 coupled to random access memory (RAM) 1004 and some variation of read-only memory (ROM) 1006. The ROM 1006 may also be other types of storage media to store programs, such as programmable ROM (PROM), erasable PROM (EPROM), etc. The processor 1002 may communicate with other internal and external components through input/output (I/O) circuitry 1008 and bussing 1010, to provide control signals, communication signals, and the like.

Figure 10:
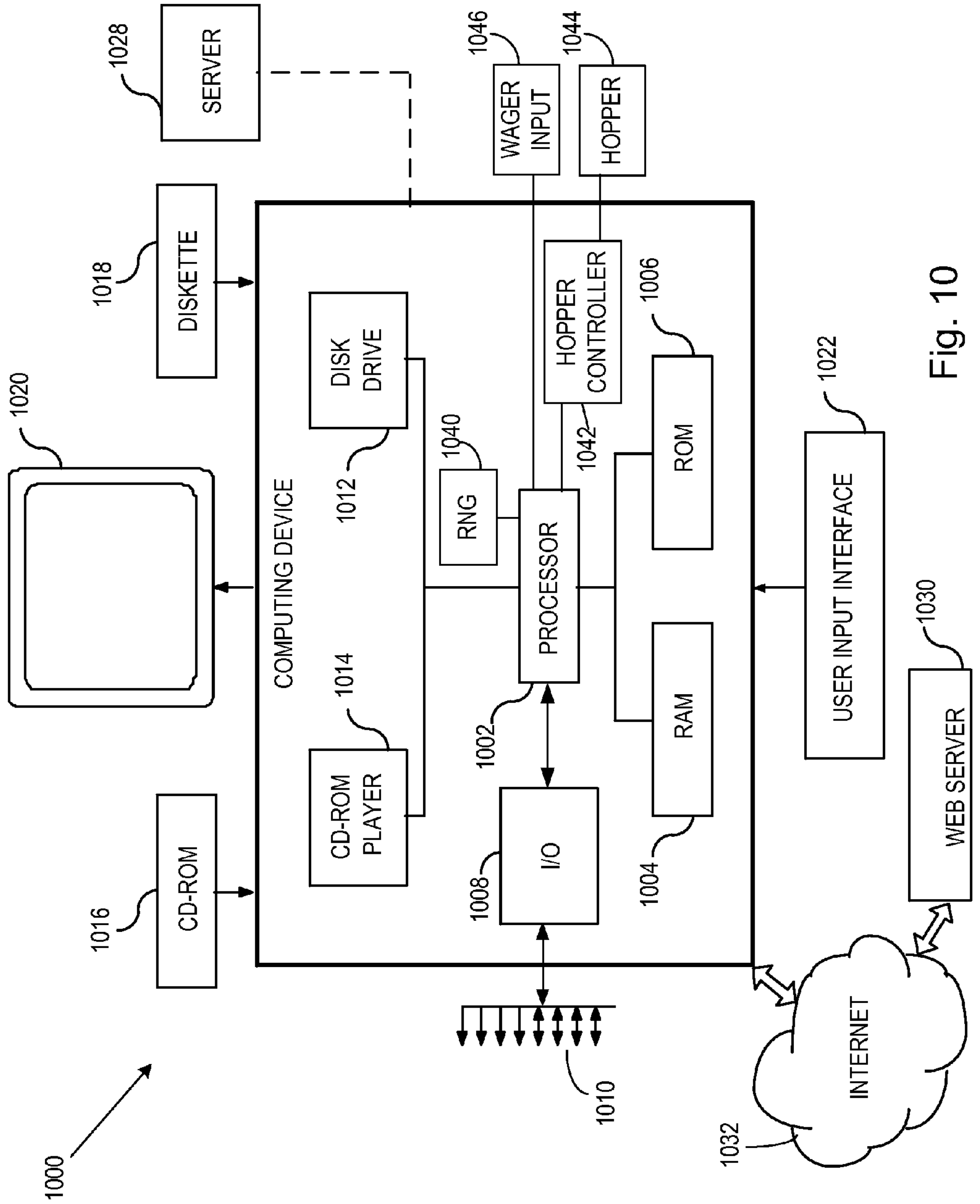
FIG. 10 illustrates circuitry capable of carrying out operations in accordance with aspects of the invention.

The circuitry represented in FIG. 10 can be wholly or partially housed within the embodiment of FIG. 9 and used to perform the various methodologies and techniques discussed herein (e.g., carry out the methods of FIGS. 3 and/or 5 to provide the game play aspects exhibited in FIGS. 1A-B, 2A-B, and/or 4A-H). RAM 1004 and/or ROM 1006 can be a computer readable medium encoded with a computer program, software, firmware, computer executable instructions, instructions capable of being executed by a computer, etc. to be executed by circuitry, such as processor 1002. For example, RAM 1004 and/or ROM 1006 can be a computer readable medium storing a computer program, execution of the computer program by processor 1002 causing the marking of a plurality of elements with markings selected from a plurality of marking-types, the plurality of marking-types including a feature marking-type and the plurality of elements forming a grid; positioning a plurality of feature indicators in the grid; for each element of the plurality that is marked with the feature marking-type and positionally associated with a feature indicator of the plurality, re-marking the feature marking-type to an element of the plurality that is adjacent to the element marked with the feature marking-type and positionally associated with the feature indicator; and determining an outcome based on one or more combinations of the markings. In similar ways, the other methods, embodiments, features, games, and techniques described and/or illustrated herein can be carried out using the circuitry represented in FIG. 10.

The exemplary device includes a processing/control unit (e.g., 1002), such as a microprocessor, reduced instruction set computer (RISC), or other central processing module. The processing unit need not be a single device, and may include one or more processors. For example, the processing unit may include a master processor and one or more associated slave processors coupled to communicate with the master processor.

Chance-based gaming systems such as slot machines, in which the present invention is applicable, are governed by random numbers and processors. Electronic reels are used to display the result of the digital reels which are actually stored in computer memory and "spun" by a random number generator (RNG). RNGs are understood in the art, and may be implemented using hardware, software operable in connection with the processor 1002, or some combination of hardware and software. In accordance with generally known technology in the field of slot machines, the processor 1002 associated with the slot machine, under appropriate program instruction, can simulate the vertical rotation of multiple reels. Generally, the RNG continuously cycles through numbers, even when the machine is not being played. The slot machine selects, for example, three random numbers. The numbers chosen at the moment the play is initiated are typically the numbers used to determine the final outcome, i.e., the outcome is settled the moment the reels are spun. The resulting random numbers are generally divided by a fixed number. This fixed number is often thirty-two, but for slot machines with large progressive jackpots it may be even greater. After dividing, the remainders will be retained. For example, if the divisor was one-hundred twenty-eight, the machine would have three remainders ranging from zero to one-hundred twenty-seven. The remainders may be considered as stops on virtual reels. If the divisor was one-hundred twenty-eight, then the virtual reels would each have one-hundred twenty-eight stops with each stop being equally likely. Each stop on the virtual reel may be mapped to a stop on an actual reel or displayed reel image. These reel images may then be displayed on the display 1020. The present invention is operable using any known RNG, and may be integrally programmed as part of the processor 1002 operation, or alternatively may be a separate RNG controller 1040. RNGs are well known in the art, and any type of RNG may be implemented for the standard mode of play and/or the bonus mode of play in accordance with the invention. Such methods and devices can be used to select elements and/or markings, among other things.

The computing arrangement 1000 may also include one or more data storage devices, including hard and floppy disk drives 1012, CD-ROM drives 1014, and other hardware capable of reading and/or storing information such as DVD, etc. In one embodiment, software for carrying out the gaming operations in accordance with the present invention may be stored and distributed on a CD-ROM 1016, diskette 1018 or other form of media capable of portably storing information. These storage media may be inserted into, and read by, devices such as the CD-ROM drive 1014, the disk drive 1012, etc. The software may also be transmitted to the computing arrangement 1000 via data signals, such as being downloaded electronically via a network, such as the Internet. Further, as previously described, the software for carrying out the functions associated with various embodiments may alternatively be stored in internal memory/storage of the computing device 1000, such as in the ROM 1006. The computing arrangement 1000 is coupled to the display 1020, which represents a display on which the gaming activities in accordance with the invention are presented. The display 1020 merely represents the "presentation" of the video information in accordance with the invention, and may be any type of known display or presentation screen, such as LCD displays, plasma display, cathode ray tubes (CRT), etc. Where the computing device 1000 represents a stand-alone or networked computer, the display 1020 may represent a standard computer terminal or display capable of displaying multiple windows, frames, etc. Where the computing device is embedded within an electronic gaming machine, such as slot machine 900 of FIG. 9, the display 1020 corresponds to the display screen 910 of FIG. 9. A user input interface 1022 such as a mouse or keyboard may be provided where the computing device 1000 is associated with a standard computer. An embodiment of a user input interface 1022 is illustrated in connection with an electronic gaming machine 900 of FIG. 9 as the various "buttons" 908. Other user input interface devices include a keyboard, a mouse, a microphone, a touch pad, a touch screen, voice-recognition system, etc.

The computing arrangement 1000 may be connected to other computing devices or gaming machines, such as via a network. The computing arrangement 1000 may be connected to a network server 1028 in an intranet or local network configuration. The computer may further be part of a larger network configuration as in a global area network (GAN) such as the Internet. In such a case, the computer accesses one or more web servers 730 via the Internet 1032.

Other components directed to slot machine implementations include manners of gaming participant payment, and gaming machine payout. For example, a slot machine including the computing arrangement 1000 may also include a hopper controller 1042 to determine the amount of payout to be provided to the participant. The hopper controller may be integrally implemented with the processor 1002, or alternatively as a separate hopper controller 1042. A hopper 1044 may also be provided in slot machine embodiments, where the hopper serves as the mechanism holding the coins/tokens of the machine. The wager input module 1046 represents any mechanism for accepting coins, tokens, coupons, bills, credit cards, smart cards, membership cards, etc. for which a participant inputs a wager amount.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

The present invention is applicable to various gaming activities that are played on a gaming board or gaming machine, including slot games such as reel slots and video slots, and other games utilizing corresponding grid elements to generate a game result. The present invention is described in terms of slot machines to provide an understanding of the invention. While the invention is particularly advantageous in the context of slot machines, and while a description in terms of slot machines facilitates an understanding of the invention, the invention is also applicable to other gaming activities of chance utilizing symbol strings as will be readily apparent to those of skill in the art from the description provided herein.

The circuitry represented in FIG. 10 can be used to perform the various methodologies and techniques discussed herein. For example, RAM 1004 can be a computer readable medium encoded with a computer program, software, computer executable instructions, instructions capable of being executed by a computer, etc, to be executed by circuitry, such as processor 1002, to cause the various other components, such as user input 1022, display 1020, hopper controller 1042 and hopper 1044, RNG 1070, etc. to perform the various operations discussed herein.

One skilled in the art of computer science from the description provided herein will be able to combine the software created as described with appropriate general purpose or special purpose computer hardware to create a computer system and/or computer subcomponents embodying the invention, and to create a computer system and/or computer subcomponents for carrying out methods of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, the present invention is not limited to what is traditionally known as "slot machines." Also, while the illustrated embodiments have been described in large part in connection with a "slot machine," other gaming systems and concepts are also within the scope of the invention, such as video poker games, card games, lotteries, and other casino events implementing a video screen. For example, a video poker game may utilize the present invention to provide multiple cards at each standard card display segment. It is thus intended that the scope of the invention be limited not with this detailed description, but rather by the claims appended hereto.

The invention claimed is:

1. A gaming device comprising:

a display;

a wager input device structured to identify and validate currency or currency based tickets; and a processor configured to:

receive a signal from the wager input device indicating that a currency or a currency based ticket has been identified for wagering, initiate a game on the display showing a grid formed by a plurality of elements, the game initiated with a wager based at least in part on the identified currency or the currency based ticket from the received signal, mark each of the plurality of elements with one of a plurality of markings, where at least one of the plurality of markings is a feature marking, position a plurality of feature indicators between adjacent elements forming the grid, indicate elements that have a feature marking and are adjacent to a feature indicator, re-mark elements that are adjacent to the indicated elements when a feature indicator is positioned between the elements and the adjacent indicated elements, respectively, and determine an outcome based on one or more combinations of the markings.

2. The game device of claim 1, wherein the processor is further configured to:

indicate elements that have a feature marking and are adjacent to another element having a feature marking that is adjacent to a feature indicator; and re-mark elements that are adjacent to the re-marked elements corresponding to the element having a feature marking that is adjacent to a feature indicator.

3. The game device of claim 1, wherein the processor is further configured to re-mark elements a second time when the re-marked elements are adjacent to two indicated elements with feature indicators positioned between the re-marked elements and each of the indicated elements.

4. The game device of claim 1, wherein the configuration of the processor to determine the outcome based on one or more combinations of the markings includes:

identifying a first set of one or more combinations of the markings after marking elements of the plurality with markings, but before re-marking the feature marking;

identifying a second set of one or more combinations of the markings after re-marking the feature marking; and issuing a payout based on the first set and the second set.

5. A gaming device comprising:

a video display device having a grid including a plurality of elements;

a player interface including at least one button, the button configured to generate a signal in response to being activated;

a wager input device structured to identify and validate currency or currency based tickets;

a memory storing data related to a plurality of markings;

secured circuitry operable to generate random numbers; and game circuitry operable to:

receive a signal from the wager input device indicating that a currency or a currency based ticket has been identified for wagering, initiate a game on the display, the game having a wager based at least in part on the identified currency or the currency based ticket from the received signal, mark each of the plurality of elements on the display with one of the plurality of markings, associate a feature marker with at least one of the plurality of elements, position at least one feature indicator between adjacent elements forming the grid, re-mark elements that are positionally related to a feature indicator when a correspondingly positioned element relative to the feature indicator is associated with a feature marker, and determine an outcome based on one or more combinations of the markings.

6. The gaming device of claim 5, wherein the elements re-marked are in a mirror-image placement to the elements associated with a feature marker about the feature indicator.

7. The gaming device of claim 5, wherein the game circuitry is operable to mark each of the plurality of elements with one of the plurality of markings by:

spinning a plurality of game reels having a plurality of game symbols within the video display; and ending the spin of the game reels to display at least a portion of each game reel on the video display.

8. The gaming device of claim 7, wherein the game circuitry is operable to associate a feature marker with at least one of the plurality of elements by associating at least one game symbol with a feature marker prior to spinning the plurality of game reels.

9. The gaming device of claim 7, wherein the game circuitry is operable to associate a feature marker with at least one of the plurality of elements by marking at least one game symbol with a feature marker after the spin has ended for the plurality of game reels.

10. The gaming device of claim 7, wherein the game circuitry is operable to position at least one feature indicator between adjacent elements forming the grid by moving the feature indicators between adjacent game reels.

11. The gaming device of claim 5, wherein the game circuitry is operable to re-mark elements that are positionally related to a feature indicator when a correspondingly positioned element relative to the feature indicator is associated with a feature marker by:

determining a directional relationship between the feature indicator and the element associated with the feature marker; and determining which element of the plurality will be re-marked based on the directional relationship.

12. The gaming device of claim 11, wherein the element to be re-marked has the same directional relationship with the element marked with the feature marker relative to the feature indicator.

13. The gaming device of claim 11, wherein the element to be re-marked has the opposite directional relationship with the element marked with the feature marker relative to the feature indicator.

14. The gaming device of claim 11, wherein the element to be re-marked has an associated directional relationship with the element marked with the feature marker relative to the feature indicator.

15. The gaming device of claim 5, wherein the element to be re-marked is re-marked with a feature indicator.

* * * * *